United States Patent [19]

Powell et al.

[11] Patent Number: 4,719,550
[45] Date of Patent: Jan. 12, 1988

[54] UNINTERRUPTIBLE POWER SUPPLY WITH ENERGY CONVERSION AND ENHANCEMENT

[75] Inventors: Jeffrey M. Powell, Galena; Don A. Gephart, Delaware, both of Ohio

[73] Assignee: Liebert Corporation, Delaware, Ohio

[21] Appl. No.: 906,176

[22] Filed: Sep. 11, 1986

[51] Int. Cl.[4] .............................................. H02M 5/45
[52] U.S. Cl. ...................................... 363/37; 307/46; 307/48; 307/66
[58] Field of Search ................ 307/46, 48, 66; 363/37

[56] References Cited

U.S. PATENT DOCUMENTS

| | | | |
|---|---|---|---|
| 3,771,012 | 11/1973 | Niederjohn | 307/66 |
| 3,836,815 | 9/1974 | Herzog | 307/66 |
| 3,925,772 | 12/1975 | Miller et al. | 307/66 |
| 4,246,633 | 1/1981 | Borkovitz | 307/66 |
| 4,277,728 | 7/1981 | Stevens | 363/37 |
| 4,313,060 | 1/1982 | Fickenscher et al. | 307/66 |
| 4,315,163 | 2/1982 | Bienville | 307/66 |
| 4,340,823 | 7/1982 | Miyazawa | 307/66 |
| 4,401,895 | 8/1983 | Patkovsek | 307/66 |
| 4,475,047 | 10/1984 | Ebert | 307/66 |
| 4,488,057 | 12/1984 | Clarke | 307/66 |
| 4,554,999 | 11/1985 | Kamaike | 307/66 |
| 4,562,357 | 12/1985 | Miyazawa | 307/66 |
| 4,634,888 | 1/1987 | Deavenport | 307/48 |

OTHER PUBLICATIONS

Cocconi et al.; "High-Frequency Isolated 4 kW Photovoltaic Inverter for Utility Interface"; Power Conversion International; May 1984, pp. 26-48.

Primary Examiner—Patrick R. Salce
Assistant Examiner—Jeffrey Starrett
Attorney, Agent, or Firm—Mueller and Smith

[57] ABSTRACT

A power supply control is disclosed which performs in conjunction with an a.c. source as may be provided by a utility line input. This line input is directed through a converter which reflects or mirrors an a.c. signal into the line input mimicing it in all aspects except that of amplitude. The opposite side of the bi-directional device is coupled to a node connection which further is coupled to an energy reservoir present as a rechargeable storage battery. An output converter device serves to develop a desired a.c. output employing the energy at the node connection. Energy transfer into the node is provided by controlling the amplitude of the input converter such that it is slightly less than that of the input utility. The apparatus is modular in design such that it may assume a variety of configurations employing either a.c. or d.c. node connections.

19 Claims, 15 Drawing Figures

UNINTERRUPTIBLE POWER SUPPLY WITH ENERGY CONVERSION AND ENHANCEMENT

BACKGROUND OF THE INVENTION

The continuing expansion and world-wide growth of technically sophisticated industries such as those concerned with computers and computer based products including telecommunications equipment have led to concomitant expansion and growth in support industries, particularly those concerned with power supplies. Technically sophisticated computer installations require assured high quality input power supplies not generally available directly from the line outputs of utilities. Accordingly, a wide range of power improvement approaches have been employed by industry. Early efforts to overcome the aberrations of line power supplies evolved a variety of power conditioning devices, for example, uninterruptible power supplies (UPS) using a battery charger, batteries, an inverter, and static switch arrangement which may be installed to evoke waveform re-creation. Further, motor generators have been provided to achieve power assurance. In some approaches, systems have been provided which modify, but do not recreate waveforms, for example, such as voltage regulators or spike suppressors. The latter systems basically are ineffective in the treatment of a variety of adverse conditions which may be encountered. More recently, a polyphase ferroresonant voltage stabilizer or synthesizer has been successfully introduced to the marketplace. In their elementary form, such synthesizers comprise a regulator which is fashioned as a non-linear saturable transformer arrangement in parallel with a capacitor assembly which is supplied from the line source through an input inductor. The saturable transformer components and capacitors form a ferroresonant circuit wherein the reactive components operate beyond the knee of a conventional magnetization curve. Such devices, for example, are described in U.S. Pat. Nos. 4,305,033 and 4,544,877 by Jeffrey M. Powell.

Even more recently, utility interactive systems have been proposed which function to independently generate a sinewave output and which are connected to a utility through some form of inductors. Employing batteries as an independent source, these devices operate with four quadrant inverters and the like in conjunction with a battery second source to skew the phase relationship of the inverter function with the utility line input to develop a selective reactive power flow. These utility interactive systems exhibit excellent power factor characteristics and impose very low distortion on the utility with which they interact.

As the expansion of power supply needs continues, requirements are developing for features of flexibility such that the supplies may be accommodated to a variety of both primary and secondary power sources. For example, as sophisticated electronic installations become located in remote locales, a capability for using any of a variety of alternate energy sources is called for. Power supplies for these applications should be operable not only in conjunction with utility line inputs, but also with such diverse sources as may generate power from wind, water, sun, and auxiliary motors. Further, for a wide variety of applications, power supply corrective systems exhibiting light weight and small size are required. The latter requirements call for a minimzation of the number of line frequency magnetic components, a flexibility of design, and a produceability at practical cost levels.

SUMMARY

The present invention is addressed to an energy conversion and enhancement system and apparatus which enjoys a high level of modularity or flexibility to meet a correspondingly broad range of applications in industry. Employable with an a.c. source input such as a utility line, the system utilizes a node connection into which and from which energy is transferred. As part of this energy transfer feature, the node connection further is operationally associated in energy transfer relationship with an energy reservoir which generally is provided as a rechargeable storage battery. Thus, energy is made available to the node either from the utility input or from the energy reservoir for application from the node to a critical load. To achieve energy transfer from the utility input, one aspect of this system provides for the mirroring of a mimicing a.c. signal into the a.c. source input with a selective control over the amplitude of the sinusoid so mirrored. This amplitude control achieves a selective energy transfer and when the utility is deficient or ceases to perform, then the reservoir is called upon to feed or pump the node to its operational energy level. During periods of non-use of the battery reservoir, the node functions in conventional manner to provide a recharging function.

The node connection itself may assume a variety of configurations. For example, it may be a simple d.c. connection with a direct battery coupling. Alternatively, the node may be a.c. in nature and the connection may be through the inductively-associated windings of a transformer. In the latter regard, space savings may be achieved by astute selection of frequencies of the a.c. signal in carrying out appropriate stepping-up and stepping-down functions. In one modularized approach, an a.c. node may be employed with alternate energy sources, for example as may be provided from wind power, solar power, and an auxiliary motor-driven generator. Where it is desired to minimize the number of battery cells required for the reservoir function, then a d.c.-to-d.c. conversion function may be employed in conjunction with a d.c. node. This conversion function serves to pump up the battery reservoir output to the desired level of the node, for example in the range of ±200 v.

Another feature of the invention is to provide a power supply control apparatus employable with an a.c source input of given frequency and amplitude to develop a regulated output for application to a load. The apparatus includes a rechargeable storage battery having a given energy level and capacity for providing energy in the form of direct current. A d.c.-to-a.c. converter is included for providing a d.c. side coupled with the storage battery and for providing an a.c. side. A node arrangement is connected in energy transfer communication with the d.c. side of the d.c.-to-a.c. converter for deriving an a.c. node connection exhibiting a predetermined a.c. energy level. Additionally, an input a.c.-to-a.c. converter is provided including a first side connectable with the a.c. source input and further includes a second side associated in energy transfer relationship with the a.c. node connection. The input converter is controllable to provide at the first side a control a.c. signal in select phase relationship with the given phase and of select amplitude. An output a.c.-toa.c. converter having an input side coupled with the a.c. node connection and an output side connectable with the load is provided for employing the energy at the node to derive the output to the load and a control arrangement is responsive to the a.c. source given amplitude, to the node a.c. energy level and to the rechargeable storage battery given energy level for controlling the input a.c.-to-a.c. converter to derive a control a.c. signal of select amplitude of value below the a.c. source given amplitude to effect maintenance of the a.c. node predetermined a.c. level and maintenance of the rechargeable battery given energy storage capacity.

As another feature, the invention provides a power supply control apparatus employable with an input a.c. source of given frequency and amplitude for providing a regulated output to a load. The apparatus includes positive and negative rails for establishing a d.c. node connection having a predetermined energy level. A capacitor arrangement is coupled with the rail for providing energy storage at the node connection and an input inverter which includes a first switching arrangement is coupled with the rails and is connectable with input a.c. source and controllable for applying an a.c. signal of select amplitude to the source at the given frequency and in phase coincidence therewith. An output inverter is provided which includes a second switching arrangement which is coupled with the rails and is energizable therefrom as well as being connectable with the load and controllable for applying an a.c. output thereto. A battery arrangement of given storage level and capacity is provided as a rechargeable energy reservoir and a level changing transformer having primary and secondary windings is provided. A bidirectional reservoir inverter having a d.c. side coupled with the battery and an a.c. side coupled with the transformer primary winding applies an a.c. output of given phase and frequency thereto and a bidirectional rectifier having controllable switching associated therewith is coupled with the step-up transformer secondary winding and the rail. Control is provided which is responsive to the a.c. source given amplitude and frequency and to the rail energy level for controlling the first switching arrangement to derive a control a.c. signal of amplitude value below that of the input a.c. source and which is selected to effect the passage of energy to the node connection to maintain the noted predetermined energy level thereof and to control the bidirectional rectifier second switching arrangement as a synchronous rectifier in the presence of adequate passage of energy from the input a.c. source.

As another feature of the invention, a driver circuit is provided for actuating a solid-state switch of a variety having gate, source, and drain terminals in response to an applied switching logic signal of select modulation frequency. The circuit includes an input circuit which responds to the applied logic signal for deriving a first on logic condition and further includes a memory capacitor which is chargeable for deriving a second on logic condition. A charge switching arrangement responds to the first on logic condition to effect a rapid charge of the memory capacitor. A logic gate is responsive to the simultaneous presence of the first and second logic conditions for deriving an on switching condition and a drive switch is provided which is coupled with the gate and source terminals and is responsive to the one switching condition for applying a gating voltage thereacross to effect the actuation of the solid-state switch. A threshold responsive network is provided having an input responsive to voltage levels at the drain terminal for providing a disable output when these levels exceed a predetermined value and a shunt is coupled with the memory capacitor for effecting a rapid discharge thereof in response to the disable output.

The invention further features a circuit for converting direct current from a source to a time varying output which includes a first switching arrangement for connection with the source in a given polar sense and which is actuable into a conductive state as well as a second switching arrangement which is connectable with the source in a polar sense opposite the given polar sense of the first switch arrangement and which also is actuable into a conductive stage. A first and second capacitor function is provided each of which is figured for selectively storing energy from a source and a first inductive winding is provided which is coupled with the first switching function and the first and second capacitor arrangements. Additionally, a second inductive winding is coupled with the second switching function and the first and second capacitor arrangement and a control is provided for actuating the first switch function to effect current conduction from the first capacitor arrangement through the first inductive winding and, simultaneously, to effect current conduction from the second capacitor arrangement through the second inductive winding and for alternately actuating the second switching function to effect current conduction from the first capacitor arrangement through the second inductive winding and, simultaneously, to effect current conduction from the second capacitor arrangement through the first inductive winding. Preferably, unidirectional conductive devices such as internal diodes are employed with the first and second switching functions to dissipate inductively induced current occurring with the cessation of the actuation of the switching functions.

The invention additionally features a power supply control apparatus employable with an a.c. source input of given frequency and amplitude for providing a regulated output to a load which includes a battery function of given storage level and capacity for providing a rechargeable storage reservoir. Additionally, a node arrangement for establishing a d.c. node connection having a predetermined energy level is provided and an input bidirectional converter coupled with a select impedance between the node connection and the a.c. source is provided. This converter is controllable to provide at the input a control a.c. signal in select phase relationship with the given phase and which is of select amplitude. An output converter is coupled between the node connection and the load for employing the energy at the node to derive the output to the load. A bi-directional reservoir inverter is provided which has a d.c. side coupled with the battery and includes an inverter switching arrangement which is actuable at a select frequency to provide a time varying output of given phase. A bi-directional a.c-to-d.c. converter is incorporated in the apparatus which has a.c. side responsive to the time varying output, a d.c. side coupled in energy transfer relationship with the node connection and including converter switching which is controllable to derive a select phase relationship of the a.c. side with respect to the time varying output. Additionally, control is provided which functions to control the converter switching to supply energy to the node connection to maintain the energy level thereat by effecting a selective lagging of the phase relationship established at the bi-directional a.c-to-d.c. converter.

Other objects and features of the invention will, in part, be obvious and will, in part, appear hereinafter.

The invention, accordingly, comprises the apparatus possessing the construction, combination of elements, and arrangement of parts which are exemplified in the following detailed disclosure. For a fuller understanding of the nature and objects of the invention, reference should be had to the following detailed description taken in connection with the accompanying drawings.

DETAILED DESCRIPTION

In its basic structure, the power supply control approach of the instant invention employs a circuit wherein a central energy reservoir such as a battery is operationally coupled with what may be termed a "node" or pumping location. This node, in turn, is connected to an energy conversion device to provide an output for driving a critical load using the energy made available at the node. Of particular importance, the node also is connected to an a.c. input functioning usually as a principal source of power, i.e. a utility line input, through an energy conversion device. This energy conversion device reflects the waveshape of the incoming a.c. energy and by amplitude adjustment which may be combined with phase adjustment, selectively supplies energy to the node and, where required, to replenish the energy reservoir. Where the a.c. input source is inadequate, the node is brought to its operational energy level by drawing upon the energy of the reservoir. Because, for many applications, the a.c. input source or utility line input confronts a conversion device output which essentially mimics it, it addresses what, in effect, is a pseudo-resistance and thus, the interface with a power utility is one exhibiting good power factor and waveform characteristics.

Of particular interest with respect to the control approach, the node may also be coupled to perform in conjunction with additional, alternate energy sources derived, for example, from motor driven generators, solar panel systems, windmills and the like with readily modularized control components.

A variety of configurations of the node driven system are available, depending upon the particular performance and cost characteristics required. These aspects are discussed in the sequence of embodiments illustrated in connection with FIGS. 1 through 6.

Figure 1:
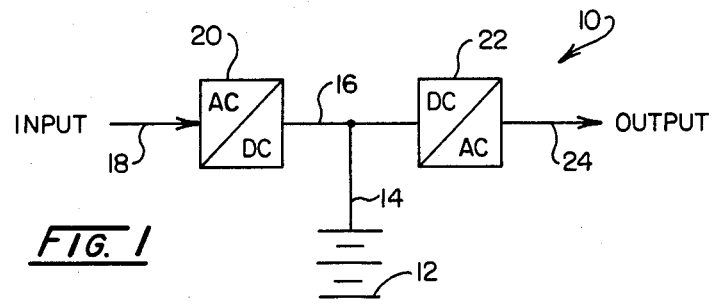
FIG. 1 is a diagrammatic view of one embodiment of the power supply control apparatus of the invention incorporating a d.c. node connection.

Referring to FIG. 1, a basic control circuit according to the invention is revealed generally at 10. Circuit 10 includes an energy reservoir present as a battery 12 which is coupled via line 14 to a node represented at line 16. This node 16 will be maintained at a predetermined d.c. energy level either by the rechargeable battery 12 or by a transfer of energy to node 16 from an a.c. input source as may be provided from a utility line as designated at 18. Both the node 16 and this a.c. energy source are coupled to a bi-directional energy converter represented at block 20. This bi-directional device 20 performs in conjunction with the frequency established at line 18, for example 60 Hz. It may be provided as a four quadrant power conversion device and it may be observed that the a.c. output of the device 20 is coupled with the a.c. input represented at line 18. Correspondingly, the d.c. terminals of device 20, which typically are considered an input, are coupled with the node line 16. Those a.c. to d.c. conversion devices which are bi-directional in nature will include inverters, cycloconverters where three phases are involved, phase control modulators and synchronous rectifiers in the case of single phase circuits. By appropriate control, the a.c. output of device 20 mimics the frequency and waveshape of the input at line 18. In effect, the output is mirrored into line 18. Correspondingly, the d.c. side of device 20 is controlled to perform in conjunction with the predetermined voltage level desired at node 16. By adjusting the amplitude of the a.c. side of device 20 to be less than the corresponding amplitude of the source at line 18, energy transfer will be provided in a backward sense to the node 16 to maintain its desired voltage level. Additionally, this energy may be employed, where required, to effect maintenance of charge capacity at battery 14. On the other hand, where the a.c. source at line 18 fails or is deficient, then the energy available from the battery reservoir 12 supplies energy to the node 16. This energy is directed to some load through another conversion device or d.c. to a.c. inverter as represented at block 22. The a.c. side of the inverter or device 22 provides an output of perfected waveshaped as represented at line 24 for presentation to a load. The circuit 10 is basic in consideration of its possible function as a UPS device, inasmuch as there is no provision for stepping up or stepping down voltage levels, as well as for separation or isolation. Further, without the isolation which might be provided for some inductive device, there is no provision from removal of common mode noise. However, where these aspects are not required, the circuit 10 is quite utilitarian. Generally, its basic cost will be determined in conjunction with the number of solid-state switching components within devices 20 and 22. Usually in the case of a three-phase system, six such components would be required for each of the devices 20 and 22 for a total of 12 for the circuit 10.

Figure 2:
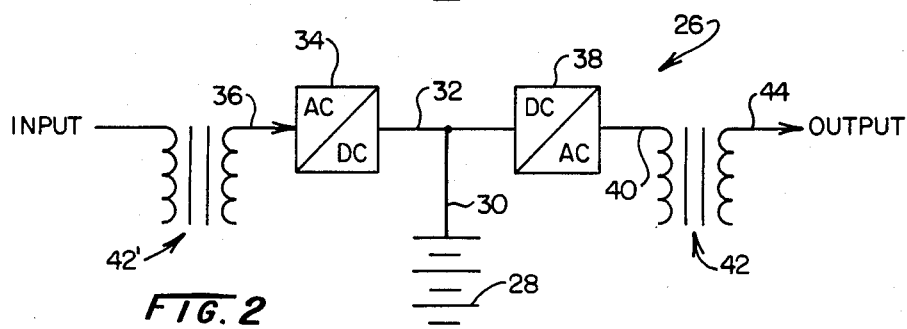
FIG. 2 is a diagrammatic drawing of another embodiment of the power supply control apparatus of the invention employing a d.c. node and an isolation component.
Figure 3:
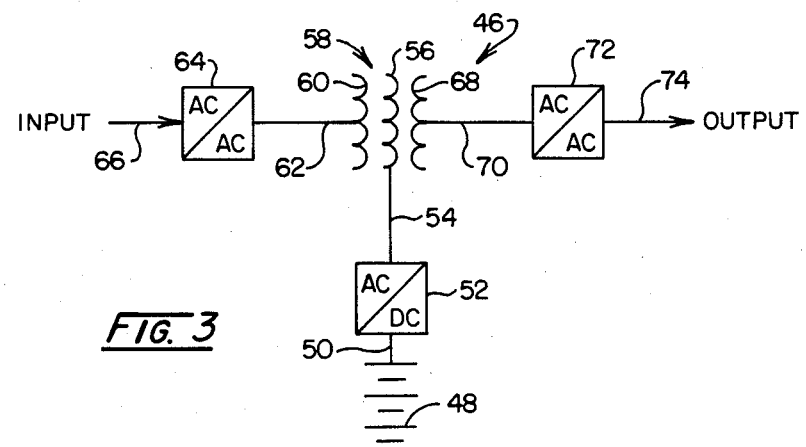
FIG. 3 is a diagrammatic drawing of another embodiment of the power supply control apparatus according to the invention showing an a.c. node arrangement.

Looking to FIG. 2, the circuit 10 is shown revised such that it incorporates a step-up-step-down capability as well as isolation. In the figure, the rechargeable battery reservoir is shown at 28 as coupled via line 30 to node line 32. As before, node 32 is connected to the d.c. terminals of an a.c. to d.c., four quadrant conversion device or inverter represented at block 34. The a.c. output of this inverter device 34 is coupled to the input of an a.c. line source represented at line 36. Additionally, the node 32 is connected to the d.c. input of a d.c. to a.c. conversion device represented at block 38. The a.c. output of device 38 is coupled via line 40 to the primary winding of a step-up or step-down transformer shown generally at 42 which provides an isolated and adjusted output at line 44. Transformer 42 also may be provided at the input 36 of the circuit 26 as represented in phantom at 42'. To gain the advantage of isolation and voltage control, the penalty of a relatively large and bulky magnetic device 42 must be accommodated for. However, the circuit at 26 promises a high level of efficiency. It further contains the same 12 switching components as required of circuit 10.

Where it is desired to avoid the large heavy magnetic devices as at 42, then resort is made to an a.c. form of linkage wherein an a.c. characterized node is employed. Referring to FIG. 3, such an arrangement is shown by the circuit revealed generally at 46. In circuit 46, an energy reservoir is depicted by the rechargeable battery 48 which is shown coupled via line 50 to the d.c. terminal of a bi-directional energy conversion device represented at block 52. This device may, for example, be provided as a four-quadrant converter having an a.c. side performing at higher frequencies, for example 50 KHz. The a.c. terminals of device 52 are coupled via line 54 to the center winding 56 of a transformer represented generally at 58. Because of its operation at relatively higher frequencies, the bulk or size and weight of this transformer 58 may be quite small. Transformer 58 is positioned at the a.c. node location of the circuit 46 and is shown coupled through winding 60 and node line 62 to one a.c. terminal of an a.c.-to-a.c. energy conversion device represented at block 64. That terminal of device 64 coupled with node line 62 performs at the higher frequency selected for the node, while the opposite terminal thereof performs at the a.c. source input frequency asserted from line 66, typically 60 Hz. As before, the converter 64 functions to reflect an a.c. waveform into source line 66 which mimics the waveform asserted at that line. Energy transfer is controlled by controlling the amplitude of this mirrored a.c. waveform such that this energy may be transferred to the node as at line 62 to be converted by device 52 to d.c. energy when the energy level or charge at battery 48 falls below a predetermined capacity level. That same energy also is employed to drive a load and is carried out from the node by virtue of the connection of a third winding 68 of transformer 58 via node line 70 to the high frequency a.c. side of an a.c.-to-a.c. conversion device represented at block 72. This high frequency a.c. input from the node 70 is converted to a desired lower frequency, for example 60 Hz by the opposite side of device 72 which, in turn, provides an output represented at line 74 for driving a load. While circuit 46 is fabricable in very small or compact size, the number of switching components required for such fabrication is elevated as compared to circuits 10 and 26 discussed above. In this regard, the a.c. nature of the conversion functions 64 and 72 requires a dual-directional control over power flow, for example cyclo-converters being employed. As a consequence, generally 12 switching components will be required for each of devices 64 and 72 and, additionally, four such switching devices are required for the bi-directional inverter 52. Thus, a total of 28 switching devices must be contemplated in considering the cost of circuit 46.

Figure 4:
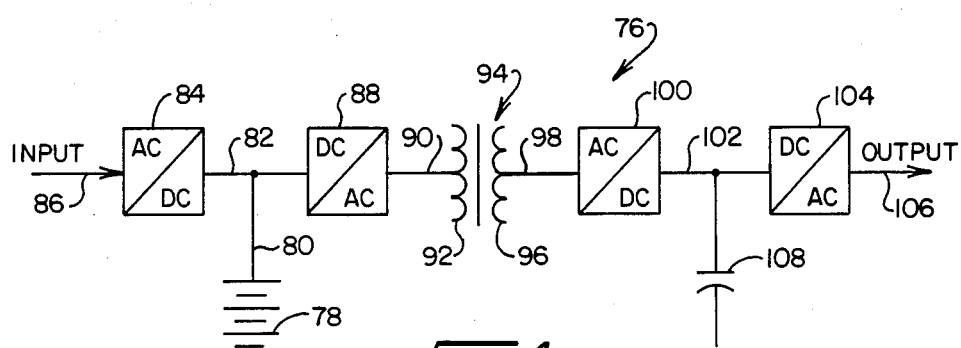
FIG. 4 is a diagrammatic drawing of another embodiment of the power supply control apparatus of the invention showing the employment of a d.c. node with an isolation component operable in conjunction with higher frequencies and a.c.-to-d.c. conversion features.

Referring to FIG. 4, a circuit shown generally at 76 is seen to combine a d.c. node structure as in FIG. 1 with a transformer or inductive linkage providing isolation and voltage level control in conjunction with relatively high frequencies to achieve compactness. The circuit 76 is shown including a rechargeable battery as an energy reservoir at 78 which is coupled via line 80 to a d.c. node represented at line 82. As before, the d.c. node at line 82 is coupled to the d.c. terminal of a conversion device represented at block 84. The a.c side of device 84, as before, is coupled with an a.c. power source such as a utility line as represented at line 86 and, as before, functions to mimic or mirror the waveshape entering at line 86 in phase coincidence. Adjustment of the amplitude of the a.c. side of device 84 controls the transfer of energy to node line 82. Node 82 also is shown directed to the d.c. side of a d.c.-to-a.c. converter represented at block 88. This conveter or inverter functions to provide a high frequency a.c. output, for example at 50 KHz as represented at output line 90. The a.c. energy at line 90 is directed to the primary winding 92 of a transformer shown generally at 94. Transformer 94 provides an appropriate voltage adjustment and the secondary winding thereof 96 is shown coupled via line 98 to the a.c. input of an a.c.-to-d.c. converter represented at block 100. Device 100 may, for example, be provided as a synchronous rectifier or inverter. The resultant d.c. energy from device 100 is directed as represented by line 102 to a d.c.-to-a.c. converter represented at block 104 which functions to convert the d.c. energy to a desired lower frequency, for example 60 Hz for presentation to a load via and output represented at line 106. Generally, a capacitor function as represented at 108 will be coupled with line 102 to provide short term energy storage to smooth out the d.c. level at line 102. Of interest with the approach of circuit 76 are the number of components involved in achieving isolation and voltage level control while gaining a desired compactness. In this regard, looking to the number of switching components involved, device 84 will have six, device 88 normally will have four, device 100 normally will have four and device 104 normally will have six such components. Thus, a total of 20 solid-state switching components are required in the fabrication of circuit 76, an improvement over the number required for circuit 46.

Figure 5:
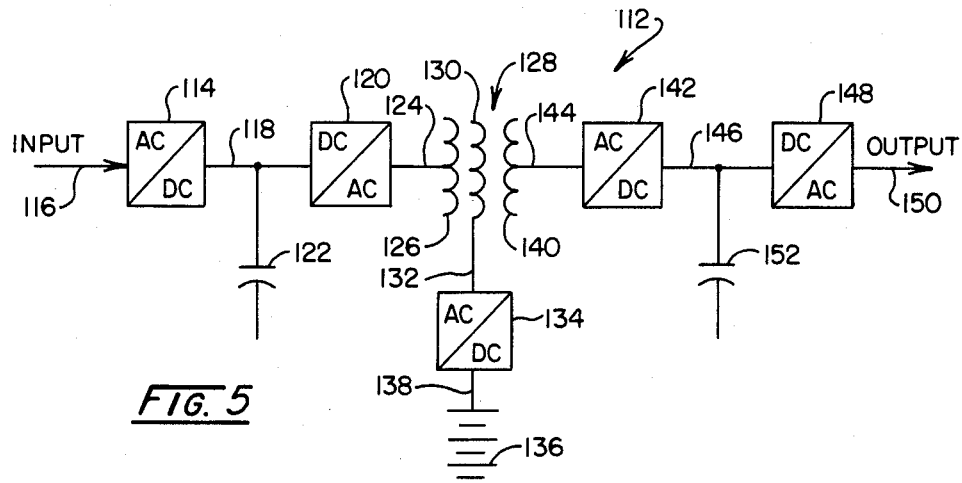
FIG. 5 is a diagrammatic drawing of another embodiment of the invention showing the employment of an a.c. node in conjunction with d.c./a.c. frequency altering components.

The approach represented by circuit 76 can be essentially implemented employing an a.c. form of node. Referring to FIG. 5, such an approach is represented by the circuit shown generally at 112. Circuit 112 is shown to provide an a.c.-to-d.c. converter or inverter as represented at block 114, the a.c. side of which is coupled with an a.c. (line) energy source as represented at line 116. As before, this a.c. side of the device 114 mimics the waveshape of and is in phase coincidence with the input source at line 116. Energy transfer control, as before, is provided by adjustment of the amplitude of the waveform of the a.c. side of converter device 114. The d.c. side of device 114 is directed as represented by line 118 to a d.c.-to-a.c. conversion device represented at block 120 which may be provided, for example, as a synchronous rectifier. A capacitor function as represented generally at 122 serves the earlier-noted function of short term energy storage and the desired higher frequency output of the device 120 which will be at a high frequency selected to minimize the size of inductive components is shown at node line 124 being directed to a winding 126 of a high frequency transformer 128. The center winding 130 of transformer 128 is coupled as represented by line 132 to a bi-directional d.c.-to-a.c. converter represented at block 134, the a.c. side of which preforming at the noted high frequency and the d.c. side of which is coupled in energy transfer relationship with a battery reservoir 136 as represented by line 138. A third winding 140 of node transformer 128 is coupled to the a.c. side of a synchronous rectifier represented at block 142 via a node line as represented at 144. The d.c. side of this rectifier 142 is coupled as represented by line 146 to the d.c. side of a d.c.-to-a.c. converter represented at block 148 which functions to provide a lower frequency output at line 150, for example 60 Hz. A capacitor function represented generally at 152 provides short term energy storage or smoothing of the energy transfer conditions represented at line 146. Circuit 112 provides the advantage of flexibilty in battery placement relative to the input. Because of the high frequency arrangement, the number of rechargeable batteries required is independent of the d.c. node or bus voltage, for example as compared with structures similar to circuit 10. In the latter regard, for a 208 volt system for circuit 10 and considering the use of typical 12 volt, 6 cell rechargeable batteries, 108 cells or 18 batteries would be required. Correspondingly, any practical number of batteries could be used with the circuit at 112. Looking to the number of switching components involved with circuit 112, device 114 would require six, device 120 would require four as well as devices 134 and 142, while device 148 would require six to show a requirement in total of 24 switching devices.

Figure 6:
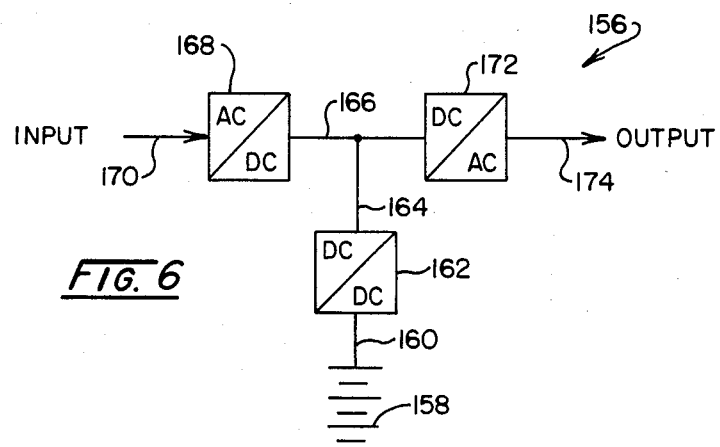
FIG. 6 is a diagrammatic drawing of another embodiment of the invention showing a d.c. node in conjunction with a d.c.-to-d.c. converter.

Looking to FIG. 6, a d.c. node circuit employing, for example, two 6 volt batteries and which is compact is revealed in general at 156. Circuit 156, which is discussed in detail later herein, employs a rechargeable battery function 158 as an energy reservoir which is coupled, as represented by line 160 to one side of a bi-directional, d.c.-to-d.c. converter represented at block 162. The opposite d.c. output of converter 162 represents a boosted voltage and, as represented by line 164 is directed to a d.c. node as represented by line 166. For typical applications, the voltage level at node 166 will be +200 volts to achieve a nominal 120 v rms output. Node 166 is coupled to the d.c. side of a d.c.-to-a.c. inverter represented at block 168, the a.c. side of which is coupled with a.c. source line power as represented at line 170. As before, the a.c. side of inverter 168 mimics or reflects the waveshape of the source input represented at line 170 and energy transfer to node 166 is effected by select adjustment of the amplitude of the reflected waveshape. Node 166 also is directed to the d.c. side of a d.c.-to-a.c. inverter represented at 172, the a.c. side of which provides a lower frequency a.c. output as represented at output line 174. Inductive components are maintained in small size with the circuit 156 through the utilization of a PWM inverter and modified or phase selective synchronous rectifier arrangement at d.c.-to-d.c. conversion function 162. In the latter regard, energy transfer is controlled by a select phase lug approach to effect conveyance of battery power to the node 166. The number of switching components involved the circuit 156 can be minimized to 8.

Figure 7:
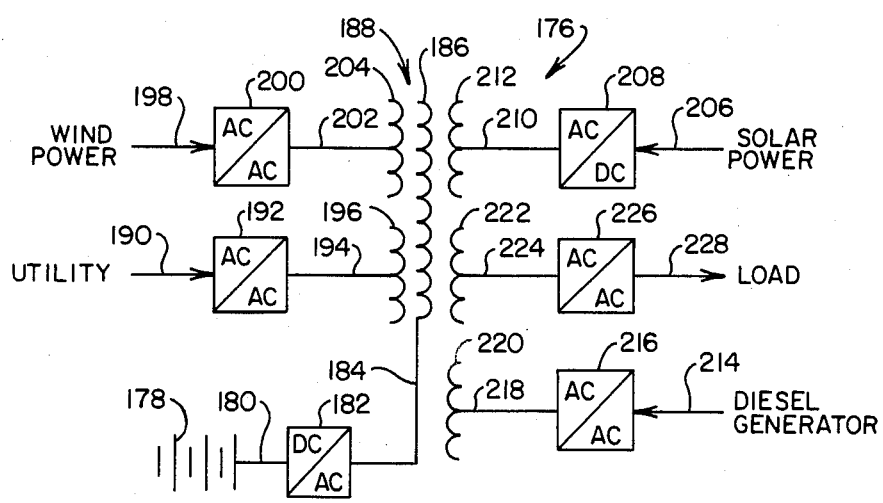
FIG. 7 is a diagrammatic drawing showing a utilitarian aspect of the invention wherein alternate energy sources are employed in conjunction with an a.c. node connection.

The flexibility of design of the node driven systems of the invention is quite useful where a variety of alternate energy sources are called for. For example, these alternate energy inputs may be quite valuable as a supplement to utility power at remote facilities such as are employed with relay systems, tracking installations and the like. This employment of alternate energy sources is shown in conjunction with an a.c. node structure in conjunction with the schematic representation of a control system represented at circuit 176 as shown in FIG. 7. Referring to the latter figure, an energy reservoir in the form of a battery function is represented at 178 which is coupled via line 180 to a bi-directional or four quadrant d.c.-to-a.c. converter represented at block 182. A resultant a.c. node then is established at line 184 and center winding 186 of a transformer function represented generally at 188. Utility or line a.c. source input may be provided as represented by line 190 which is treated in the manner of the invention, for example as described in conjunction with circuits 46 and 112 which now is represented by the a.c.-to-a.c. power treatment block 192. The resultant a.c. output as represented at line 194 is applied to the a.c. node through the winding 196. To supplement this energy supply, alternate energy inputs are provided. In this regard, the energy derived from wind power through windmills and the like may be applied to the node. Such an input of energy is represented at line 198 extending to an appropriate interface of an a.c.-to-a.c. variety as represented at block 200 for providing energy transfer as at line 202 to the node through winding 204. With the type control involved, the windmills can be operated at optimum loading during periods of wind availability to avoid both stall and excessive rotational drive. In similar fashion, solar power may be employed as an alternate energy source for the system 176. The d.c. input of from a solar panel array is represented at line 206 as extending to an appropriate input side device in accordance with the invention and represented at block 208. As before, block 208 may be developed in accordance with the arrangements, for example, of respective blocks 52 and 134 of circuits 46 and 112. A resultant communication between the solar power input and the node is represented at line 210 and winding 212. The system also is usable with an alternate energy source such as a diesel driven generator, such associated or input being represented at line 214. With the system, the diesel engine or like prime mover can be operated in conjunction with an induction motor which can be used with the system, for example, employing battery power, to start the diesel engine. The induction motor then would be operated to pump power into the node, the interface being represented at block 216, line 218, and winding 220. Because of the characteristics of the instant node driven system, the engine generator arrangement need not be driven at full speed as is typical with such devices, the system being able to extract power when the mechanical drive input is operated at lower speeds and thus at higer efficiencies depending upon the loading involved. Concerning the load, that aspect now is represented by the association of the load with the node through winding 222, line 224, block 226 and line 228. Block 226 may assume the function, as represented in earlier-described circuit 46 at block 72 or as generally discussed in conjunction with blocks 142 and 148 of circuit 112.

Figure 8:
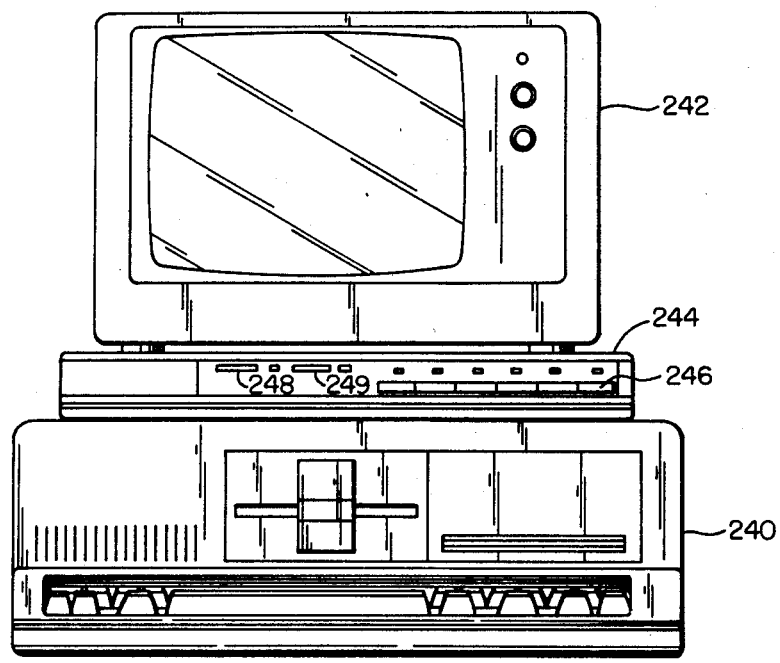
FIG. 8 is a pictorial representation of the employment of the embodiment of FIG. 6 of the invention with a personal computer.

A detailed discussion of the implementation of the power supply control apparatus of the invention as described in FIG. 6 at 156 is provided in the discourse to follow. It may be recalled that this implementation employs a d.c.-to-d.c. bi-directional converter to drive a d.c. node from a battery reservoir source which, as a consequence, may be provided, for instance, as two 6 volt batteries to achieve a requisite compactness. This form of circuit finds particular utility as small devices which "clean-up" typical utility power and, additionally, function as an uninterruptible power supply for delicate electronic devices such as person computers, scientific instruments, and the like. The former utilization of the device is shown in the pictorial representation of FIG. 8 where a typical personal computer console is shown at 240 in conjunction with a monitor 242. Between these two components 240 and 242, there is positioned a rectangular and relatively thin node driven unit 244 which is configured according to the invention. The controls presented to the operator upon the forward face of device 244 are quite simple, including switching at 246 to enable rearwardly disposed plug outlets as well as power consumption and battery condition bar graphs shown, respectively, at 248 and 249. As is apparent, the unit 244 is plugged into a typical a.c. outlet and the computer components are plugged into the outputs of the unit 244. While remaining small, the unit 244 incorporates all of the battery reservoir sources and controls necessary to achieve complete UPS and waveform treatment functions.

Figure 9:
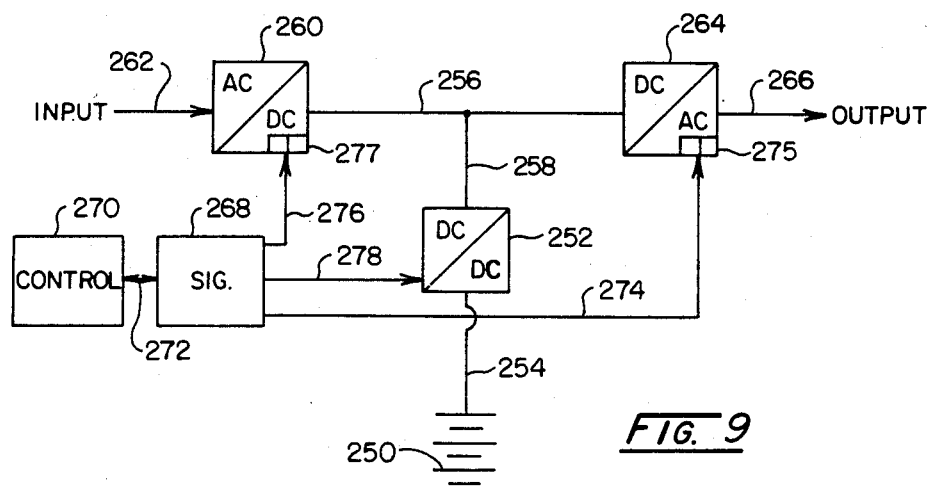
FIG. 9 is a block diagrammatic view of the embodiment of FIG. 6 of the invention showing a slightly enhanced level of detail.

Looking to FIG. 9, a generalized block diagram of the circuit employed within the unit 244 is set forth. The figure shows a battery reservoir 250 which performs in conjunction with d.c. to d.c bi-directional converter 252 as represented by line 254. Converter 252 derives a boosted voltage output which is directed to the rails of a node represented at line 256, such association being represented by line 258. Node line 256 is coupled to the d.c. side of an a.c.-to-d.c. converter represented at block 260, the a.c. side of which is coupled to utility line power as represented at line 262. The output of the system is addressed by a d.c.-to-a.c. converter represented at block 264 to provide an improved and secure output as represented at line 266. Control features of the device to be described will be seen to be generated from two circuit groupings, a signal circuit grouping represented at block 268 and a control component grouping represented at block 270. This control grouping of components includes power supplies, enabling logic, logic derived from monitoring of the node 256 and the drivers which are employed with the d.c.-to-d.c. components 252. Enabling logic developed by the control components is employed by the signal grouping of components as represented by line 272. Concerning the assemblage of components represented by block 268, PWM signals directed to the output inverter drivers 275 are developed and directed to those drivers as represented by line 274 and, in similar fashion, the PWM controlling output to the inverter drivers 277 of bi-directional converter 260 is represented by line 276. A d.c.-to-d.c. rectifier phase lag control is presented to the converter 252 from the signal components as represented at line 278. Also, described is a preferred form of driver circuit as noted at dual blocks 275 and 277, employed with the input and output inverter functions.

Figure 10A:
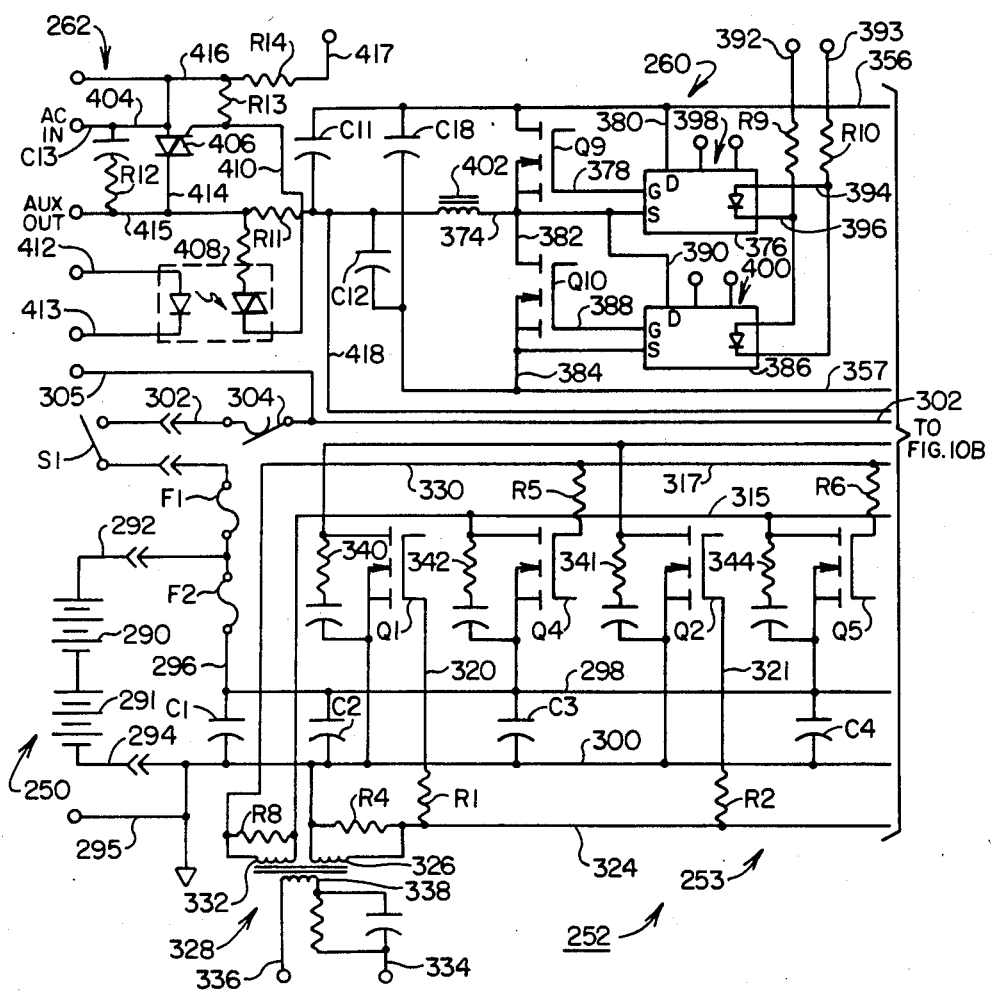
FIGS. 10A and 10B combine to provide a schematic circuit diagram of the input and output inverter functions as well as the d.c.-to-d.c. function of the embodiment of FIG. 6 and 9.
Figure 10B:
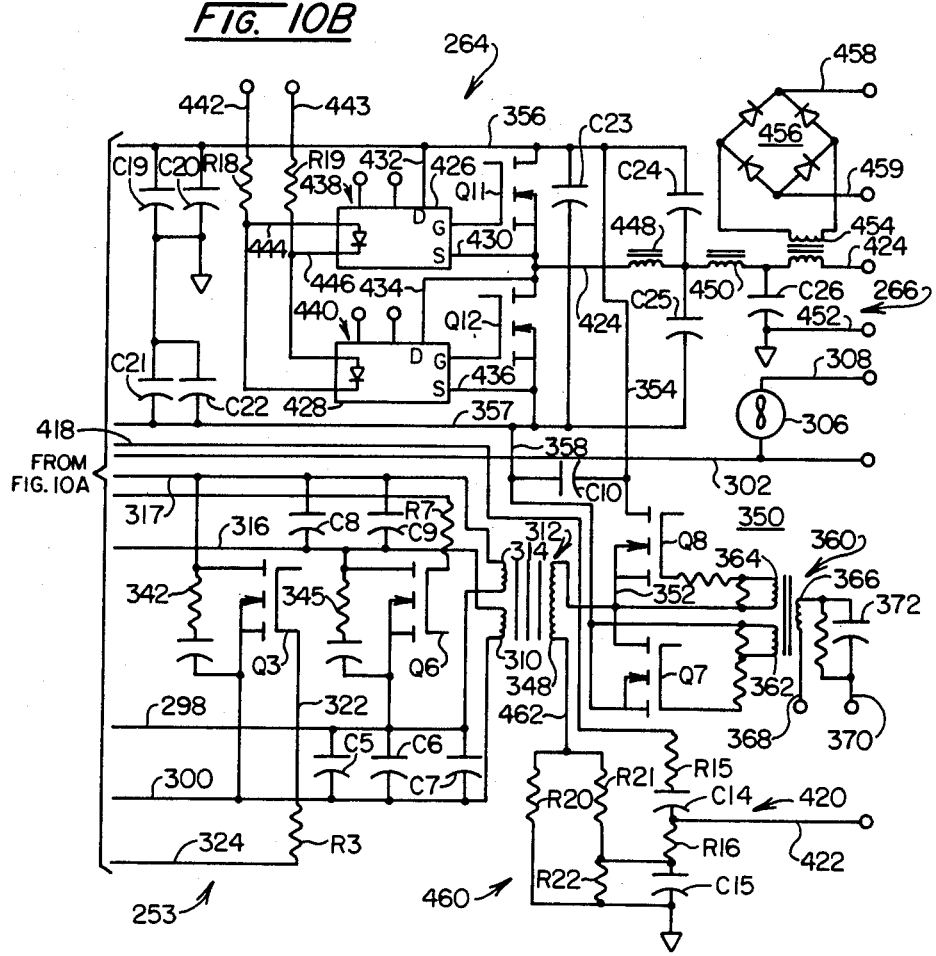

The features represented by blocks 252, 260, and 264 are revealed in an enhanced level of detail in conjunction with FIGS. 10A-10B which should be considered in side-by-side fashion as represented by the labels on each. Referring to FIG. 10A, it may be observed that the battery reservoir function retains the general numeric designation, 250 and the d.c.-to-d.c. bi-directional conversion or boosting function again is represented in general by the number 252. FIG. 10A shows that the battery reservoir function 250 incorporates two rechargeable 6 volt batteries represented at 290 and 291. These batteries are coupled across lines 292 and 294. Lines 292 and 294 extend via line 296 and a fuse F2 to positive and negative battery rails shown, respectively, at 298 and 300. A terminal line 295 is shown extending from line 294. Line 292 additionally is shown extending through a fuse F1 to an on-off switch S1 for the unit which closes against a terminal coupled with a line 302 containing a thermal protector 304. Line 302 additionally extends to terminal line 305 which provides a BATT+ connection employed by the circuit. As shown in FIG. 10B, this direct battery voltage serves, inter alia, to power the d.c. motor of a small cooling fan 306 which returns to minus through line and connector 308. By powering the fan 306 from a d.c. source, its size may be advantageously diminished and by coupling it to the battery function 250, air circulation needed for operation in the event of utility line failure is provided.

Looking to both FIGS. 10A and 10B, the d.c.-to-d.c. bi-directional converter 252 is represented. In its general structure, the converter 252 combines an inverter 253 with a network 350 resembling a synchronous rectifier to develop a boosted d.c. output. Looking initially to the inverter 253, the two principal rails thereof are earlier noted lines 298 and 300. The figures reveal that these two principal rails, respectively carrying about +12 v and −12 v battery voltage are associated or coupled together in terms of high frequency alternating current by a capacitor function comprised of capacitors C1 through C7. FIG. 10B shows that rail 300 is coupled to one end of a primary winding 310 of a step-up transformer represented generally at 312. In similar fashion, rail 298 extends to one side of another primary winding 314 of transformer 312. The opposite end of winding 310 is coupled to a "swing" rail 316, while the corresponding opposite end of winding 314 is coupled to a "swing" rail 317. Rails 316 and 317 as well as corresponding windings 310 and 314 will be seen to be separated by the battery voltage, but are tied together by a capacitor function including capacitors C8 and C9 shown in FIG. 10B. The switching components of this inverter portion of converter 252 are comprised of two parallel groupings of three power MOSFET transistors, one parallel grouping thereof being represented at transistors Q1–Q3 and the other parallel grouping being represented by transistors Q4–Q6. A parallel coupling of the transistor grouping provides for improved drain-source characteristics for higher current drive capabilities. The gates of transistors Q1-Q3 are coupled via respective lines 320-322 and resistors R1-R3 to line 324 to extend, in turn, to one secondary winding 326 of an isolation transformer 328. The opposite side of winding 326 is coupled to positive rail 300 and a resistor R4 is coupled across the winding. In similar fashion, the gates of transistors Q4-Q6 are coupled through respective resistors R5-R7 and line 330 to one side of secondary winding 332 of isolation transformer 328. A resistor R8 is coupled across that same winding. The two transistor groupings are switched such that one grouping is on while the other is off and there exists a short, dead band interval intermediate switching from one group to the other such that both are off for a short interval. Logic providing this drive emanates from the control components represented at block 270 in FIG. 9. Drive input is developed from along lines 334 and 336 which are coupled to either end of primary winding 338 of isolation transformer 328. These drive inputs are alternately reversed and, due to the polarity reversal developed from windings 326 and 332, one grouping of transistors is turned on while the other is held off. Small R-C snubber circuits as at 340-345 provide damping or protection against ringing or over-currents in conjunction with respective transistors Q1-Q6.

As a consequence of the unique coupling of the two windings 310 and 314 in association with the combination of capacitors C1-C7 and C8-C9, a voltage doubling is developed. In achieving this performance, it may be observed that the battery voltage appears across the capacitor grouping C1-C7 inasmuch as there is no d.c. drop across an individual transformer winding. Further, it may be noted that the positive ends of capacitor grouping C1-C7 and capacitor grouping C8-C9 are coupled together through primary winding 310. As switching commences through the transistor grouping, there thus becomes an adding of voltages and the circuit performs as a half-bridge inverter which runs essentially from 24 volts. Looking to the current passage achieving this, it may be observed that when transistor grouping Q4-Q6 is on, current is flowing from the positive side of capacitor groupings C8-C9 and through winding 314, through transistor grouping Q4-Q6 to the negative side of capacitor grouping C1-C7. Additionally, current is flowing from the positive side of the latter capacitor grouping, through transistor grouping Q4-Q6 and winding 310 back to the negative side of capacitor grouping C1-C7. Inductively derived higher currents which occur upon the turning off of transistor grouping Q4-Q6 are dissipated by conduction through the body diodes of transistor grouping Q1-Q3 through winding 310, the noted diodes, through capacitor grouping C8-C9 and thence returning to the winding. The opposite current flow obtains, of course, with the turning on of transistor grouping Q1-Q3. These transistors may be provided, for example, as a type BUZ11 marketed by Siemens, Inc.

Figure 11:
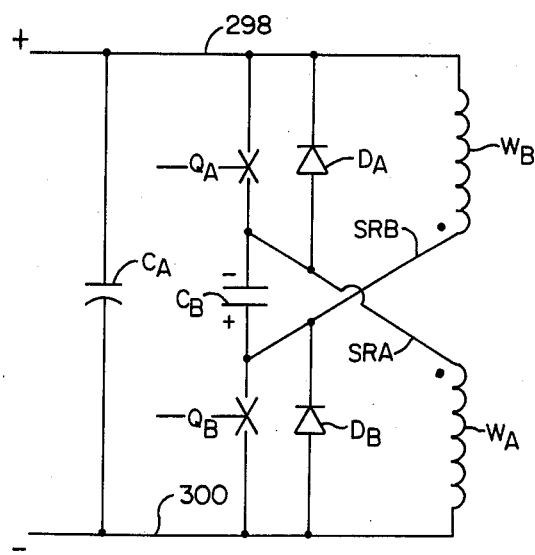
FIG. 11 is a schematic representation of an inverter employed with the circuit of FIGS. 10A and 10B.

Looking momentarily to FIG. 11, a simplified schematic representation of the operational features of the inverter circuit 253 is revealed. The circuit works essentially in push-pull fashion to gain the advantage of a doubling or boosting voltage output and as well, incorporates the advantages of a half-bridge inverter without the attendant disadvantages of either the push-pull or the half-bridge type systems. In effect, a full utilization of the transformer primary windings is achieved and only one switch will occur in series with the current path at any given time. Thus switch occasioned voltage drops are diminished by a factor of one-half. Additionally, a firm clamping action is provided for the inductive spikes developed at turn-off of the switching components. In the figure, the positive and neagtive battery rails of the inverter again are reproduced, respectively, at 298 and 300. These rails, in terms of high frequency a.c. operation, are shorted together by the capacitor function identified as $C_A$. The primary windings of the transformer involved in the device 52 are represented in the figure at $W_A$ and $W_B$ along with the dots representing identical polarity. The switching function as carried out in the above embodiment by the above-described MOSFET devices, is represented at $Q_A$ and $Q_B$. Of course, many forms of switching techniques will be found adequate for the instant circuit. It may be observed that the second capacitor function $C_B$ is coupled intermediate these switches. Two lines which have been designated as "swing rails" are represented at SRA and SRB, while the diodes associated with the switching or transistor functions are represented at $D_A$ and $D_B$. In the above embodiment, body diodes are employed for the function of diodes $D_A$ and $D_B$. With the arrangement shown, the 12 volt battery voltage will appear across capacitor function $C_A$ and, additionally, that voltage will occur across capacitor function $C_B$ in consequence of the coupling of swing rails SRA and SRB through respective windings WA and WB to respective rails 300 and 298. In consequence of both capacitor functions carrying this battery voltage, the switching technique is one where the voltage carried by them is combined in an additive manner to effect the boosting function. It further may be noted that capacitor function $C_B$ also operates to couple winding WA with winding WB in parallel from an a.c. standpoint. In operation, assuming that switch function or transistor function $Q_A$ is on, current will flow from capacitor function $C_B$ into the dot polarity side of winding $W_B$ and thence through switching function $Q_A$ to the negative side of capacitor function $C_B$. Additionally, current will flow from the positive side of capacitor function $C_A$ through switching function $Q_A$ and into winding $W_A$ from the dot polarity side thereof to return to the negative side of capacitor function $C_A$. Thus, current is flowing through both transformer windings with the on condition of a single switching function. Further, that current is being drawn from both capacitor functions $C_A$ and $C_B$. When the transistor or switching function $Q_A$ is suddenly turned off, any leakage reactance within the primary windings that is not coupled into the secondary winding will tend to effect energy storage and a clamping function accommodates for that tendency, an arrangement being provided wherein the voltage can swing back to a finite safe value and current can continue to flow until the energy is dissipated. This inductive effect will cause the dot polarity side of the windings $W_A$ and $W_B$ to assume a negative voltage condition and, as a consequence, the body diode function $D_B$ commences to conduct and the current continues to flow through winding $W_A$ and through diode function $D_B$ and capacitor function $C_B$ and swing rail SRA. Similarly, the energy stored with respect to winding $W_B$ conducts in a path including that winding, capacitor function $C_A$ and the same diode function $D_B$. Thus, the diode function $D_B$ clamps or conducts inductively induced currents from both windings on the noted half cycle of operation. On the next following half cycle, switching function $Q_B$ is turned on and the opposite performance occurs, the system operating between +12 v and −12 v in conjunction with each corresponding half cycle of operation. Generally, the windings as at $W_A$ and $W_B$ should be bifilar wound to effect the operation wherein both capacitor functions $C_A$ and $C_B$ are employed to drive both windings simultaneously with the actuation of the singular switch.

Referring to FIG. 10B, transformer 312 performs a step-up function in conjunction with its output winding 348. However, to achieve a boosting effect, the transformer 312 is designed to have a specified amount of leakage reactance, for example 80 microhenries. This is carried out through conventional pie windings to develop the equivalent of an essentially perfect transformer with an 80 microhenry choke in series with it on the output. Such structuring saves a magnetic core, as well as the space attendant therewith and provides an improvement in efficiency because only one core is being excited. The feature is employed in a voltage boosting arrangement such that during operation of the converter 252 on battery reserve power alone, as the battery voltage diminishes, rail voltage can be maintained within acceptable limits by, in effect, boosting the prerectified output of transformer 312. Of course, a discrete additional inductor may be employed in place of the leakage reactance.

Secondary winding 348 of transformer 312 is coupled with a halfbridge inverter represented generally at 350 and comprised of two high voltage power MOSFET transistors Q7 and Q8 which are mutually coupled in a half bridge configuration. In this regard, the source of transitor Q8 is coupled with the drain of transistor Q7 through a junction identified as line 342 which, in turn, is connected to the high end of secondary winding 348. The drain of transistor Q8 is coupled by line 354 to a positive high voltage rail 356 which functions in conjunction with a corresponding negative voltage rail 357 to establish the function of node line 256 as described in conjunction with FIG. 9. Correspondingly, the source of transistor Q7 is coupled by line 358 to negative rail 357. Squarewave pulse drive into the gates of transistors Q7 and Q8 is developed through an isolation transformer 360 having secondary windings 362 and 364 and a primary, input winding 366. Winding 366 is energized in an alternating polarity sense from lines 368 and 370. A small R-C network as shown generally at 372 is provided for discriminating against d.c. levels, while a capacitor C10 is coupled between lines 354 and 358 to perform as a snubber protecting the half-bridge device 350 from spurious signals and the like.

When the drive input to lines 368 and 370 is in phase coincidence with that driving the inverter operating in conjunction with battery 250, as at lines 334 and 336, (FIG. 10A) then the device 360 performs as a conventional synchronous rectifier. As such, it rectifies the secondary voltage at winding 348 and feeds it to the high voltage rails 356 and 357. However, the signal components described at block 268 in FIG. 9 will be seen to develop a phase lag control based upon node rail (356, 357) voltage and a reference to selectively lag the input at lines 368 and 370 with respect to the squarewave input submitted at lines 334 and 336 (FIG. 10A). By so varying this amount of lag, the system can, in turn, vary the amount of voltage boost developed by the d.c.-to-d.c. converter 252. Since transistors Q7 and Q8 are driven switches, at such time as line power is available and the battery voltage commences to fall, the system will work in a reverse sense, passing power in the other direction to charge the battery to its nominally fully charged value, for example 13.8 volts.

Returning to FIG. 10A, the bi-directional input inverter or conversion device 260 (FIG. 9) is shown to be comprised of power MOSFET transistors or switching devices Q9 and Q10 which may be provided, for example, as type BUZ385 marketed by Siemens Corp. The drain of transistor Q9 is coupled to high voltage rail 356. This rail, to achieve a conventional 120 v rms a.c. output is retained at, for example, +200 v d.c. The source of transistor Q9 is coupled to line 374 which, for the present structure, may be considered to have a combined input-output function. The gate of transistor Q9 is coupled to the gate terminal output of a driver circuit 376 via line 378. A source terminal output of circuit 376 is shown coupled to line 374, and the drain terminal output thereof is shown coupled to rail 356 through line 380. In alternate fashion, the drain of transistor Q10 is coupled through line 382 to input-output line 374, while the source thereof is coupled to low voltage rail line 357 through line 384. In correspondence with rail 356, rail 357 preferably is maintained at a −200 v d.c. level to achieve conventional 120 v a.c. output from the system. Gate input to transistor Q10 is provided from a driver circuit 386 from line 388, while the drain output of circuit 386 is coupled to input-output line 374 via line 390. Input inverter drivers 376 and 380 receive a PWM drive signal from lines 392 and 393 incorporating respective resistors R9 and R10. The signals applied from lines 392 and 393 are directed via lines 394 and 369 to an opto-coupled actuator within circuit 376, while the corresponding opto-coupling input to driver circuit 386 is provided from the noted lines 392 and 393. Circuits 376 and 386 are driven in alternating fashion with a dead band delay interval between the turning off of one circuit and the turning on of the other and are powered from a power supply via dual line inputs represented respectively at 398 and 400. Further, the circuits 376 and 386 will be seen to perform a current limiting function wherein the source-drain voltage of transistors Q9 and Q10 is monitored as representative of current flow. In the event that current is excessive, then the pertinent transistor is turned off until the next PWM cycle.

Inverter 260, when thus driven, provides a squarewave at what normally would be considered its output at line 374. The output is filtered to achieve a sinusoid waveshape through employment of capacitors C11–C12 operating in conjunction with an inductor 402. This sinusoid is developed by a PWM input to lines 392 and 393 which is controlled such that it is synchronized or in phase coincidence with incoming a.c. line power but with an amplitude which is controlled such that when the amplitude reflected into line power is less than the amplitude of line power, energy is passed into the node comprised of rails 356 and 357. For line power employment, the amplitude adjustment is made by comparison of the line input level with a rail error signal selected to achieve a high rail voltage, for example at ±200 v.

The sinusoidal output of inverter 260 as "seen" by the incoming a.c. utility at line 374 will be predominantly resistive in nature in consequence of a relatively large value resistor, R11. This resistor within the line 374 functions to dominate the inductive nature of device 402. Further, a pseudo-resistive effect is achieved as a result of the phase synchronization of the output with the incoming line input. As the size of the capacities of the UPS devices increase beyond the embodiment here described employing amplitude adjustment control, then the addition of inductive control will be beneficial. This is achieved by the assertion of a lag in phase to the confronting output of inverter 260 at line 374.

Now looking to the a.c. input to the circuit earlier described at 262 in FIG. 9, line power is introduced via line 404. Line 404 is directed to a triac switching device 406 which, in turn, is controlled from a triac driver 408 by connection therewith from line 410. Driver 408 is enabled by opto-coupling achieved by applying a d.c. level signal across lines 412 and 413. The output of triac 406 is provided at lines 414, 415 and earlier described input line 374. Filtering, comprised of capacitor C13 and resistor R12 extending between lines 404 and 374 is provided to accommodate spurious signals and the like which otherwise may affect the drive of device 406. A ballasting resistor R13 is shown coupled between line 410 and an a.c. tap line 416. Line 416 extends to resistor R14 and line 417 to provide a line proportional signal for use in synchronization for the input drive to the oscillator deriving the control input to the inverter at 252. Similarly, a tap for developing control over the system is provided at line 418 which is seen extending to a voltage divider network 420 in FIG. 10B. Network 420 is formed of resistors R15 and R16g performing in conjunction with capacitors C14 and C15 and provides the requisite proportional output of the a.c. line input at line 422. Returning to FIG. 10A, auxiliary output electrical receptors or plugs are provided with the device 244 (FIG. 8) by connection with line 415. Thus, these auxiliary outputs are enabled by triac 406. When the unit is off, the receptacles will be disabled.

Under conditions of normal operation, power will be supplied to the system from a.c. line 404 and thus, the control over bi-directional converter 260 will be such that the mirrored sinewave reflected into the a.c. input will, for the instant embodiment, have an amplitude selected below the amplitude of the incoming line power. This energy is converted by converter 260 to a d.c. form and is stored in a sequence of capacitors identified at C18–C23 shown coupled to d.c. rails 356 and 357 in each of FIGS. 10A and 10B. The output d.c.-to-a.c. converter described in conjunction with FIG. 9 at 264 is again represented in general by that numeral in FIG. 10B and is seen to be structured essentially identically with the bi-directional input converter 260. In this regard, the inverter 264 is formed as a half-bridge inverter incorporating two MOSFET transistors Q11 and Q12 which may be provided, for example, as the above-noted type BUZ385. Transistors Q11 and Q12, as before, are coupled across rails 356 and 357, the drain of transistor Q11 being coupled to rail 356, while the source of transistor Q12 is coupled to rail 357. The source and drain terminals of respective transistors Q11 and Q12 are coupled with output line 424 and their gates are coupled to respective driver circuits 426 and 428. Driver circuits 426 and 428 are structured identically with those described earlier at 376 and 386 in conjunction with FIG. 10A. In this regard, the source of transistor Q11 is coupled to the corresponding terminal of driver circuit 426 through line 430, while the drain terminal thereof is connected to rail 356 through line 432. In similar fashion, the drain of transistor Q12 is coupled to the corresponding terminal of circuit 428 through line 434, while the source of transistor Q12 is connected to the corresponding source terminal of circuit 428 through line 436. Circuits 426 and 428 receive logic level power inputs from respective dual line groupings 438 and 440 and they receive PWM logic switching inputs from the signal components discussed in connection with block 268 of FIG. 9 from lines 442 and 443. Note that these lines extend through respective resistors R18 and R19 to an opto-coupling within driver circuit 428 and through additional respective lines 444 and 446 to an opto-coupling in driver circuit 426. The polarities of the opto-couplings are reversed such that the drive is complementary in that first one transistor as at Q11 is turned on following which a dead band interval occurs where no transistor is turned on following which transistor Q12 is turned on. To achieve a consistent output at line 424, the PWM drive at lines 442 and 443 is developed in correspondence with the voltage difference between node rails 356 and 357. In this regard, it is desirable to maintain the rails at one higher level of d.c. voltage for line energization, for example, ±200 v. However, when the energy of the battery reservoir 250 is called upon to supply output, then it is desirable to operate at a lower rail voltage, for example ±170 v. The output at line 424 is formed as a sinusoid by a filter including inductor 448 and capacitors C24 and C25. This output further is RF filtered in view of the switching frequencies of the system by the combination of capacitor C26 with inductor 450. Thus, the output of the system is provided at lines 424 and ground line 452. As noted earlier in conjunction with display 248 of the device 244 in FIG. 8, a bar graph is employed to show the extent of current flowing within a given load. To provide the signal to this annunciator function, a current transformer 454 functioning in conjunction with a full wave bridge 456 supplies the requisite d.c. level signal to the annunciator function 248 via lines 458 and 459.

FIG. 10B also reveals an offset correction network 460 which is coupled by line 462 to one side of the secondary winding of that transformer 312. Operational experience with the devices at hand indicates that a loop condition may develop where slight unbalance in the drives of the switching components occurs which will, in turn, evolve an unbalance in the symmetry of the squarewaves which are generated. This, in effect, produces a small d.c. offset which may accumulate from component to component. The net effect is to draw direct current from the utility and pass it through the inverter functions. To correct for this, a voltage is developed across resistors R20-R22 and a portion of that d.c. phenomenon then is applied back into the input function 260 in the form of a d.c. cancellation or bias correction. Recall that the function of the inverter at 260 is to mirror back the signal purporting to emanate from the utility input line 404, i.e. the system is mirroring back a direct current level that is equal and opposite to the direct current which the unit is creating. This evolves a cancellation and the unit draws no more current than it actually needs to provide essential energy conversion.

Figure 12:
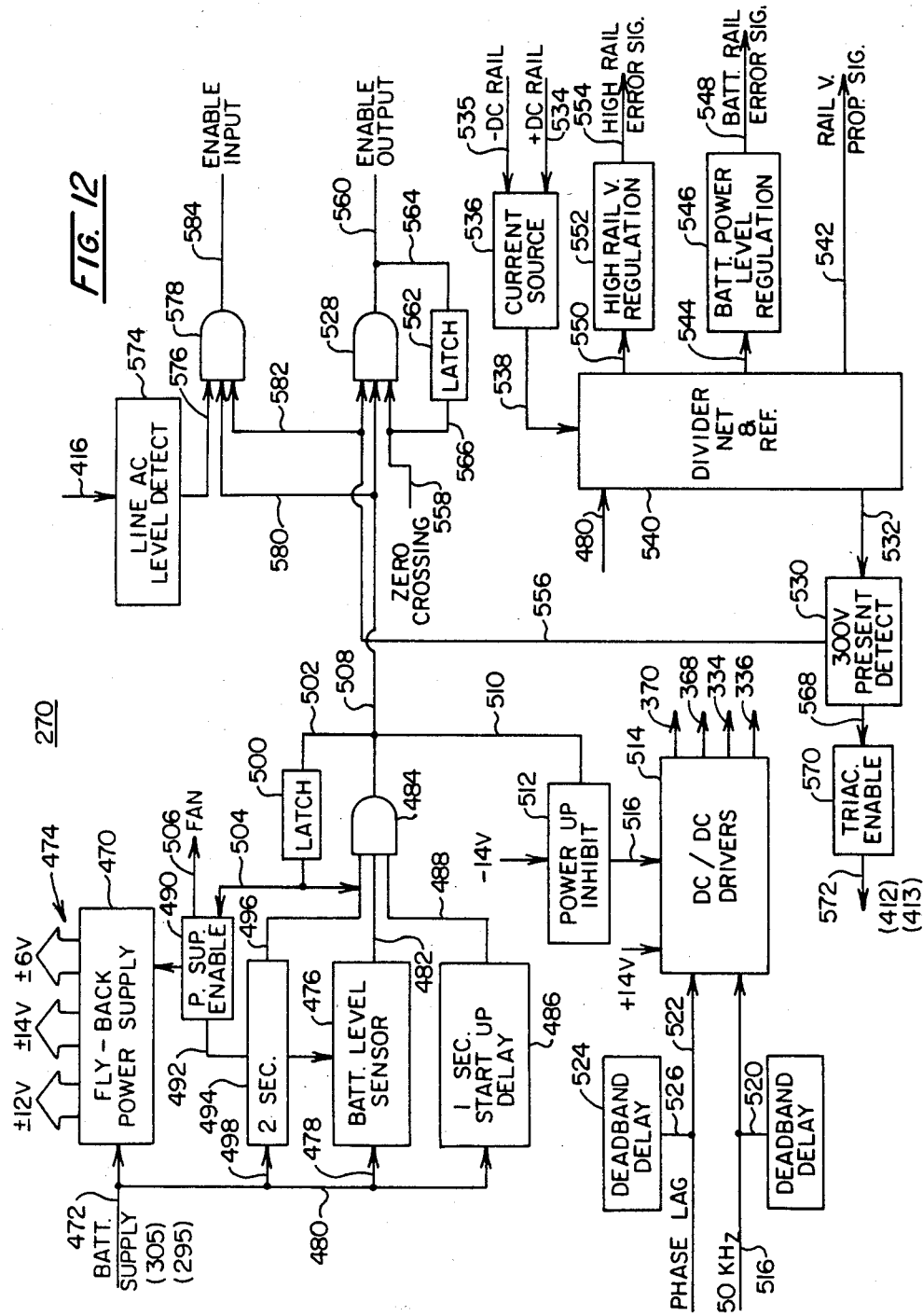
FIG. 12 is a block schematic diagram of the control designated components of FIG. 9.

Referring to FIG. 12, the control components described generally in conjunction with block 270 in FIG. 9 are revealed in block diagrammatic fashion at an enhanced level. This control function 270 contains a power supply which may be of a conventional fly-back variety, as represented at block 470. The inputs to the power supply 470 are those provided from the battery function 250 as represented generally at 472. However, in FIG. 10A, the supply lines from the battery rails have been described at lines 295 and 302 as represented in parenthesis in FIG. 12. As represented by three arrows shown generally at 474, the power supply at block 470 develops ±12 v, ±14 v output and ±6 v outputs which are employed throughout the circuit. However, the mere closure of switch S1 (FIG. 10A) will not immediately enable this power supply function. In particular, a sequence of conditions are imposed upon the use of the power supply at start-up with the closure switch S1. Because start-up commences utilizing battery power, the voltage level of the batteries are evaluated as represented by block 476 operating in conjunction with lines 478 and 480. In the event that the battery level is adequate, then a positive output is supplied at line 482 to one input of a three input AND gate 484. Additionally, as represented at block 486, a one second time delay is imposed at start-up which responds to battery supply monitoring from line 480 and provides a positive input at line 488 to gate 484 at the termination of the one second interval. Finally, the power supply 470 is enabled by a network shown at block 490 and, as represented by line 492 and block 494, this intitial enablement is generated for an interval of about two seconds and provides positive input to gate 484 or that interval as represented at line 496. Note that the two second enablement also is responsive to battery voltage as represented at line 498. In the event that all conditions are correct and all inputs to AND gate 484 are positive, then the system will latch to an "on" condition as represented by block 500 and lines 502 and 504. As represented at line 506, control is also exerted over fan 306 (FIG. 10B) from this power supply enable function. Preferably, the function serves to provide an "automatic shutdown" action wherein, under circumstances where line input power is lost and battery power is relied upon, the system will shut down to preserve the battery at such time as battery voltage reaches a predetermined low level. To restart the system, the operator is called upon to turn off the switch S1 and then turn it back on again under conditions of proper line power input. Such an arrangement will prevent costly loss of batteries otherwise occasioned by their excessive draw down. The result of the start-up logic is the provision of one enable signal at the output line 508 of AND function gate 484.

Inasmuch as the d.c./d.c. converter function 252 is initially activated in the system, it may be observed that the enabling signal at line 508 is directed via line 510 to a power up inhibit function represented at block 512. This function serves to assure that the power supply has closely approached its −14 v supply, i.e. to about −12 v before the drivers to the d.c./d.c. function are enabled. Inasmuch as battery power is continuously fed to the d.c./d.c. function, it is important that assured control be provided over the drivers thereto. Accordingly, when the system has reached requisite power supply levels, then the d.c./d.c. drivers represented by block 514 are enabled as represented by the association of blocks 512 and 514 through line 516. Provided, for example, as type D469 by Siliconix Corp., the driver function 514 provides the earlier-noted 50 KHz drive input to lines 334 and 336 (FIG. 10A). This high frequency (50 KHz) input to the drivers is represented as emanating from line 516. As noted earlier, to assure proper performance of the switching function associated with the driver, a dead interval band delay as represented by block 518 and line 520 is provided wherein both switching functions are off for a short interval before one given switching function is turned on. In similar fashion, a high frequency drive is provided to the rectifying function of the d.c./d.c. system as represented by line 522 and associated dead band delay represented by block 524 and line 526. By imposing a predetermined phase lag into the rectifier function via lines 368 and 370 (FIG. 10B), energy may be transferred from the battery reservoir into the node rails 356–357 for an initial start-up of the system under battery power.

The output inverter function represented at block 264 in FIG. 9 is enabled to perform in the system in conjunction with AND logic presented to AND gate 528. One input to this AND function at gate 528 is provided from the start-up enable signal presented from line 508. A second input to the gate is generated from a "300 v Present Detect" network represented at block 530. This detection circuit receives its input from taps monitoring the node rails 356 and 357 and represented respectively at lines 534 and 535. The node rails from these connections then are coupled to a current source network represented at block 536. The output of network 536 at line 538 provides a current which is proportional to the voltage level at the node rails 536 and 537 and is directed to a divider network represented at block 540. In addition to providing an output to the "300 v Present Detect" network 530, the divider network also provides an output at line 542 which is proportional to the voltage at the rails 356 and 357. Additionally, the divider network provides an appropriately divided input at line 544 to a network represented at block 546 which develops an error signal, the function of which is to maintain rails 536 and 537 at a predetermined voltage level suited for operating the system under battery reservoir power. This level may be, for example, ±150 v (300 volt total range) and is controlled by the error signal at line 548. In similar manner, the network 540 provides an input via line 550 to a high rail voltage regulation network represented at block 552 which develops an error signal selected to maintain node rails 356 and 357 at requisite operating voltage levels when the system is deriving power or energy from its a.c. line input. As represented by the arrow labeled 480 leading to block 540 and corresponding with line 480 extending from the battery supply line 472, network 540 also monitors the "float voltage" of the batteries 250 to assure that no overcharge conditions occur. This is carried out by effecting an increase in the phone lag exhibited by rectifier 350 in the presence of a sensed overcharging condition.

Returning to the "300 v Present Detect" network 530, when the rails 356 and 357 have developed an appropriate level for performance under battery operation, then a second enabling input is provided to AND gate 528 through line 556. The third enabling input to gate 528 is derived from line 558 which provides a logic high enabling input to the gate on the occurrence of a sinusoid cross-over detected in conjunction with the line power input. As this cross-over occurs, an enabling output is provided at line 560 and this enabling signal is latched for continuity by a latching function represented at block 562 which is coupled between output line 560 and input 558 by lines 564 and 566.

The triac drive 408 is enabled only following the detection of the noted 300 v level at node rails 356 and 357. When this level is achieved, network 530 provides a signal as represented at line 568 to a "Triac Enable" network 570 which, in turn, provides an output represented at line 572 which functions to provide an appropriate logic level as at lines 412 and 413 (FIG. 10A) to carry out the noted enablement by opto-coupling. The enablement of the triac 406 also is employed to enable auxiliary plug outlets from line 415 as shown in FIG. 10A.

When thus enabled, the level of the a.c. input may be detected from line 416 (FIG. 10A), which line is reproduced in FIG. 12 leading to a level detect function represented at block 574. Network 574 provides a logic high signal at line 576 at such time as a select RMS voltage value is witnessed at the a.c. input, for example in the nature of about 100 v. The resultant signal at line 576 is presented to one input of a three input AND gate 578. The second input to gate 578 is derived from line 580 and is the start-up enabling signal presented from gate 484 and line 508. The third input to gate 578 is derived from line 582 which extends to line 556 and thus carries the 300 volt present enabling signal derived from the network represented at block 530. Thus, with all logic conditions met at the input to gate 578, an enabling signal is provided at line 584 for use in conjunction with the input a.c.-d.c. bi-directional conversion function represented generally at 260.

Figure 13:
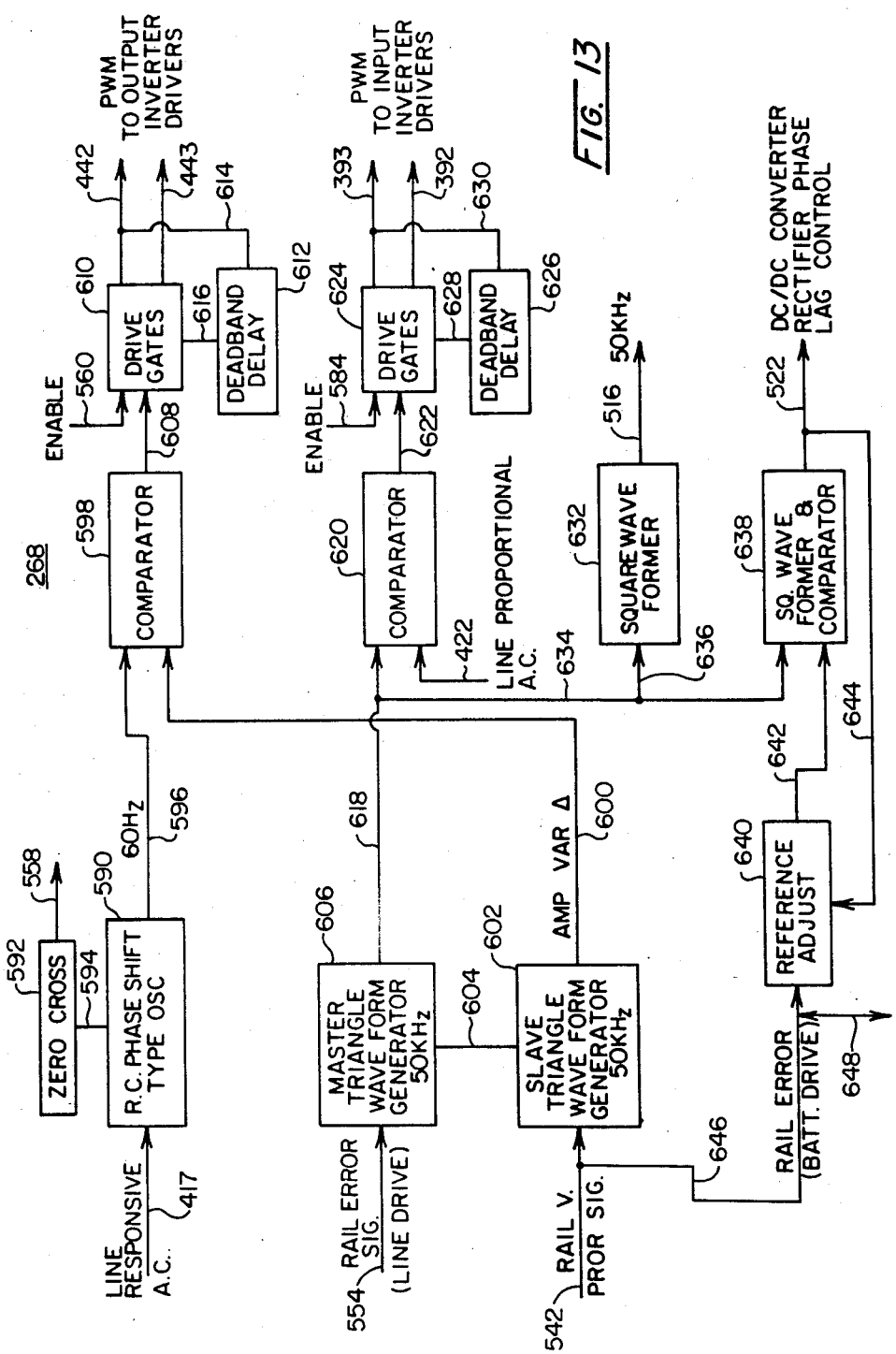
FIG. 13 is a block schematic diagram of the signal designated components of FIG. 9.

Turning to FIG. 13, the components of block 268 as discussed in conjunction with FIG. 9 are revealed in block diagrammatic fashion. These components function to provide the PWM signals required by the output inverter drivers and input inverter drivers as well as the d.c./d.c. inverter rectifier by which node control with respect to the battery is achieved. The drawing shows that a line responsive a.c. signal is provided as described at 417 in FIG. 10A as being developed from the triac 406. The signal is shown presented along line 417 to an R-C phase shift type oscillator represented at block 590. In the presence of an a.c. responsive signal at line 417, the oscillator 590 is caused to operate in phase coincidence therewith. However, in the absence of line power the oscillator free runs at, for example, 60 Hz. As indicated by block 592 and line 594 the earlier-described zero crossing signal developed at line 558 also is derived from the phase shift oscillator 590. The resultant 60 Hz signal, whether developed in free running style or in phase coincidence with the line input 417, is provided at line 596 and presented to one side of a comparator represented at block 598. To derive a PWM form of signal, the opposite input to comparator 598 is derived as a triangle waveform of high frequency (50 KHz) introduced from line 600 which represents the output of a slave triangle waveform generator represented at block 602. Operating at 50 KHz, the generator 602 is slaved as represented by line 604 to a master triangle waveform generator represented at block 606. The generator represented at block 602 is operated in correspondence with the rail voltage proportional signal described in conjunction with FIG. 12 at line 542, that line again being represented in FIG. 13. Generator 602 performs such that the amplitude of the triangle waveform is made proportional to the rail voltage introduced from line 542. With such an arrangement, regardless of what the node rail voltage at lines 346 and 357 may turn out to be, the output voltage will remain consistent, for example 120 v rms through this feed forward technique. Accordingly, the combined phase responsive and high frequency triangle waveform combination is developed at output line 608 of comparator 598 and, upon the appropriate presentation of an enabling signal as described earlier at line 560 (FIG. 12), functions to develop appropriate drive inputs to a drive gate represented by block 610 to derive PWM output at driver input lines 442 and 443 which have been described in conjunction with FIG. 10B and are reproduced in the instant figure. As before, a dead band delay is provided in conjunction with the drive imparted to lines 442 and 443 such that no drive is provided for a small interval between a given switching function. This dead band delay is represented by blocks 612 in conjunction with lines 614 and 616.

In similar fashion, the high frequency triangle waveform generator 606 responds to an error signal representing any deviation of rails 356 and 357 from a predetermined operational voltage level, for example, (400 v) ±200 v as described at line 554 in FIG. 12. The latter line is again represented in the instant figure and the output of the master triangle waveform generator represented at block 606 is provided, as represented at line 618, for presentation to one side of a comparator function represented at block 620. The amplitude of the triangle waveform at line 618 is developed proportionately with any error between the desired voltage level at node rails 356 and 357 and the actual voltage thereat. In this regard, the amplitude of the triangle waveform derived at network 606 is adjusted in accordance with a regulation scheme, i.e. the amplitude is increased where the node rail voltage falls below reference and vice versa. This lowers the amplitude of the waveshape reflected to the utility and permits passage of power into the node. Note additionally that the input at line 422 directly reflects the waveshape of the utility to improve the extraction of power from it by amplitude adjustment of the reflected wave. Comparator 620 performs in conventional fashion in conjunction with the line proportional a.c. signal developed at line 422 in FIG. 10B to provide an output at line 622 which is employed to drive a gate function represented at block 624. Gate drives as represented at block 624 provide the earlier-noted PWM type drives to the input inverter drivers via lines 392 and 393 which are reproduced again in the instant figure. The dead band delay is provided intermediate the switching drive outputs at lines 392 and 393 as represented by function block 626 and associated lines 628 and 630.

The output of the master triangle waveform generator represented at block 606 also is used to provide a synchronized squarewave at the same high frequency as is represented at block 632 communicating with line 618 through lines 634 and 336. A resultant 50 KHz squarewave output is shown at line 516 as earlier-described in conjunction with FIG. 12 as being employed to actuate the d.c./d.c. drivers represented at block 514 and introduced to the inverter switching at lines 334 and 336. It has been found beneficial in controlling the relative phase relationship between inverter 253 and rectifier 350 to assert a slight (5°) phase lag to the drive at block 632. This, in effect, results in a slight (battery charging) lead at the interface of these conversion components which facilitates zero point control with respect to their interrelationship. This phase lead condition also will facilitate battery charging when necessitated.

Line 634 also extends to one input of another comparator function represented at block 638 which provides the select phase lag control into the d.c./d.c. drive outputs earlier described at lines 368 and 370 (FIG. 10B). The opposite input to comparator 638 is derived from a reference adjust network represented by block 640 and associated output line 642 thereof. The Reference Adjust function at block 640 responds to the output of line 522 of comparator 630 as developed at line 644, as well as to the rail voltage proportional signal at line 542 by virtue of the coupling thereof to the reference 640 through line 646. This signal at line 646 also is regulated by earlier-described battery rail error signal at line 548 (FIG. 12) which is reproduced in the instant figure. With the arrangement shown, where the node rail voltage is lower than the reference level determined appropriate for battery operation, then the output at line 522 provides a greater lag phase shift drive to d.c./d.c. drivers 514 and drive output lines 368 and 370. This will cause a boosting of the voltage applied to the node rails 356-357 (FIG. 10B) from the system. Where the node rail voltage is appropriate for battery operation, then no phase lag is imposed and the rectifier switching components Q7 and Q8 described in conjunction with FIG. 10B perform in the manner of a synchronous rectifier.

FIGS. 10A and 10B show the implementation of driver circuits 376 and 386 on the input conversion stage (FIG. 10A) and circuits 426 and 428 driving the respective MOSFET transistors Q11 and Q12 for the output converter (FIG. 10B). These circuits are identically structured and are represented by the circuit drawing of FIG. 14. Referring to that figure, a typical such driver circuit is represented generally at 650. Circuit 650 functions to provide an isolation of the logic signals applied to drive power transistors Q9-Q12 as well as to transmit those signals to the latter transistors to permit their appropriate switching. Another function of the circuit 650 is of a current limiting nature wherein it performs in a manner in which the power transistor with which it is associated appears as a current source or high impedance source. This is a safety feature inasmuch as the safe current levels of the switching devices should not be exceeded and thus, an overcurrent protection is provided. Additionally, the circuit accommodates for a full or 100 percent modulation condition which often will occur in the development of peaks of sinusoids with PWM signals, notwithstanding the overcurrent protection provided.

Figure 14:
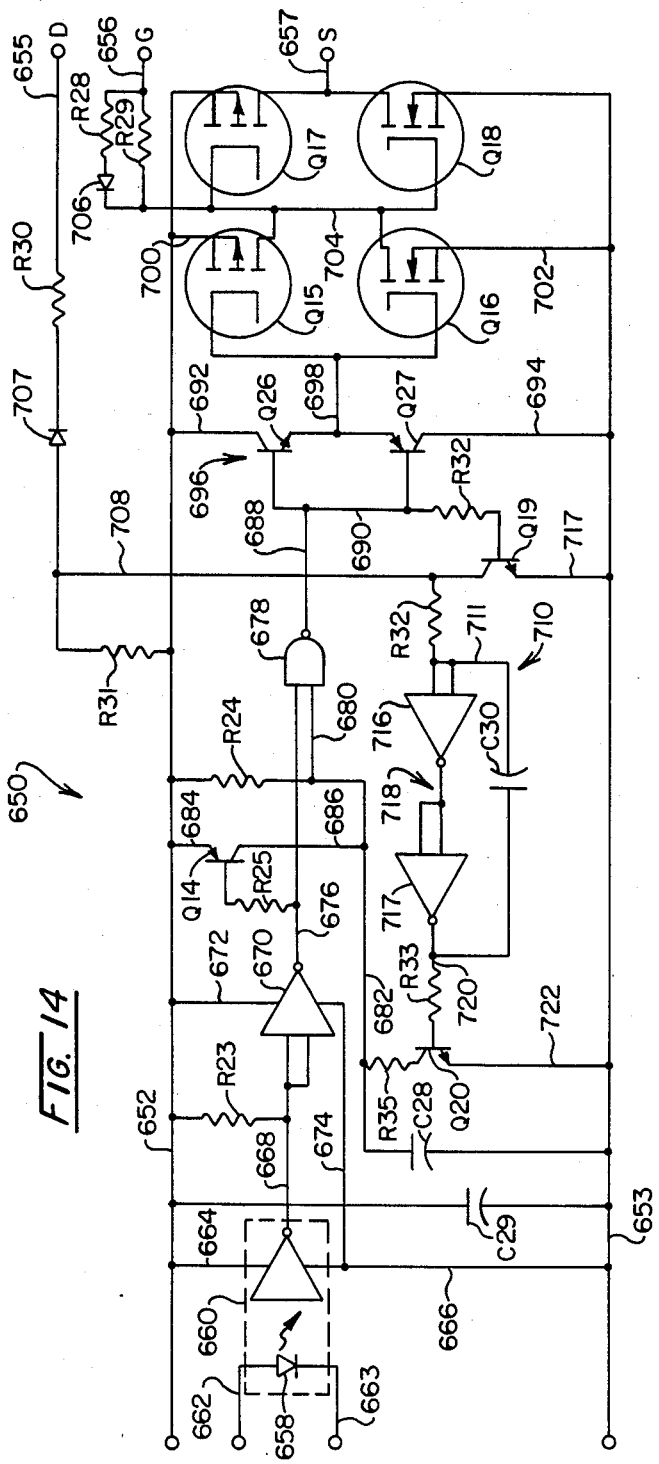
FIG. 14 is a circuit diagram of a driver circuit employed with the control circuit of the apparatus of the instant invention.

Looking to FIG. 14, the driver circuit 650 is seen to be powered respectively with plus and minus 12 v supply at rails 652 and 653. Connections are provided to the drain, gate and source terminals of the appropriate power transistors Q9-Q12 through respective lines 655-657. Additionally, appropriate PWM logic drive is provided to the circuit 650 by application of a logic signal to an LED 658 of opto-coupler circuit 660 through leads 662 and 663. Circuit 660 is coupled across rails 652 and 653 by lines 664 and 666 and the imposition of a switching logic input from leads 662 and 663 results in a logic low level output at line 668. Line 668 is seen directed to the inputs of a Schmitt type NAND component 670 coupled across rails 652 and 653 by lines 672 and 674. Component 670 functions to sharpen or improve the quality of pulse asserted at its input and develops an inverted signal (on logic) condition corresponding thereto at output line 676. Line 676, in turn, is directed to one input of NAND gate 678. Under normal operational conditions, the opposite input at line 680 to gate 678 also is at a logic high (on logic condition) in consequence of its coupling to line 682 and memory capacitor C28. Capacitor C28 will be charged to +12 v as a consequence of any previous off signal wherein line 676 carries a logic low signal to turn on a charge switching function present at transistor Q14 as a consequence of the coupling of its base to line 676 through resistor R25. Note, in this regard, that the emitter of transistor Q14 is coupled through line 684 to rail 652, while the collector thereof is coupled via line 686 and line 682 to capacitor C28.

Returning to the actuating or on switching condition, the output of NAND gate 678 at line 688 for such condition of turn-on will be at a logic low level which is reflected at line 690 coupled, in turn, to the base terminals of transistors Q26 and Q27, the collectors of which are coupled via respective lines 692 and 694 to rails 652 and 653. These transistors form a current amplification network represented generally at 696 having an output at line 698 coupled to the gates of a complementary pair of MOSFET transistors Q15 and Q16. The source terminals of respective transistors Q15 and Q16 are coupled to rails 652 and 653 by lines 700 and 702, while the drain terminals thereof are coupled in common with line 704 extending through diode 706 and resistors R28 and R29 to line 656 and the gate of a power MOSFET transistor (FIGS. 10A-10B). The on signal asserted through network 696 drives the chain connection of complementary transistors Q15 and Q16 at line 704 to a logic high or +12 v state. This ties the power MOSFET transistor gate to +12 v through diodes 706 and resistors R28 and R29. It also supplies a logic high sigal to the gates of a second pair of complementary MOSFET transistors Q17 and Q18. Such action functions to turn transistor Q18 on and thus couple the source of the power MOSFET transistor at line 657 to the −12 v return at rail 653 to evolve a +12 v gate to source condition on the transistor to turn it on. As the transistor commences to turn on, the drain voltage thereof is monitored from line 655 including resistor R30 and diode 702 as seen coupled to rail 652 through resistor R31. Line 655 additionally is coupled through line 708 to an R-C network 710 including resistor R32, line 711 and capacitor C30. Line 708 additionally extends to the collector of a transistor Q19, the emitter of which is coupled via line 712 to rail 653. The base of transistor Q19 is coupled through resistor R32 to line 690 and thus the transistor is normally in an off state during a condition of circuit 650 wherein the turning on of the power transistor is under way. An off state of transistor Q19 permits the voltage line 708, which corresponds to current at the power transistor, to be witnessed at network 710. The slight time delay achieved by network 710 ameliorates any initial high turn on voltages which may be encountered. However, as the network 710 effects the charging of capacitor C30, the resultant voltage signal level at line 714 is witnessed at the input stage of a non-inverting Scmitt trigger including a second or output stage 717 thereof. Following the approximately 1 microsecond time-out for network 710, if the voltage witnessed from line 708 exceeds the threshold at input stage 716 of trigger 718, then the output thereof at line 720 assumes a logic high which is directed through resistor R33 to the base of transistor Q20. The emitter of transistor Q20 is coupled by line 722 to rail 653 and its collector through resistor R35 to line 682. Thus, as the transistor is turned on, memory capacitor C28 is rapidly discharged to remove the logic high level at input line 680 to gate 678. This changes the output of the gate at line 688 to a logic high to effect the turning off of the power transistor. In consequence, the threshold input to trigger circuit 718 is removed and transistor Q20 is turned off. Under the logic conditions thus encountered, the power transistor will remain off even through on pulse logic conditions remain through the energization of LED 658. It is only upon the removal of such energization and the reversion of line 676 to a logic low value that the capacitor C28 again will be charged because of the turning on of transistor Q14.

Under the noted conditions of very high modulation at the peak of sinusoids, no turn-off signals may occur. As a consequence, transistor Q14 will not be turned on to charge memory capacitor C28. Thus, a condition may occur in which the system would maintain the power MOSFET transistor in an off condition over the peak of the sinusoid. To accommodate for this, memory capacitor C28 will be charged to a logic high level through resistor R24 within line 682 over an interval corresponding with a modulation rate less than that of the PWM modulation of 50 KHz. For example, the time constant for the combination of resistor R24 and memory capacitor C28 may be set to correspond with a rate of 40 KHz such that the combination is inactive during normal operation but in the event of loss of modulation, would become active to assert an on condition over the peak of any given sinusoid.

Since certain changes may be made to the above-described apparatus and system without departing from the scope of the invention herein, it is intended that all matter contained in the description thereof or shown in the accompanying drawings shall be interpreted as illustrative and not in a limiting sense.

We claim:

1. Power supply control apparatus employable with an a.c. source input of given phase, frequency and amplitude to provide a regulated output to a load, comprising:
   rechargeable storage battery means having a given energy level and a capacity for providing energy in the form of direct current;
   d.c.-to-a.c. converter means for providing a d.c. side coupled with said storage battery means and an a.c. side;
   node means in energy transfer communication with said d.c. side of said d.c.-to-a.c. converter means for deriving an a.c. node connection exhibiting a predetermined a.c. energy level;
   an input a.c.-to-a.c. converter including a first side connectable with said a.c. source input and a second side associated in energy transfer relationship with said a.c. node connection and controllable to provide at said first side a control a.c. signal in select phase relationship with said given phase and of select amplitude;
   an output a.c.-to-a.c. converter having an input side coupled with said a.c. node connection and an output side connectable with said load for employing said energy at said node to derive said output to said load; and
   control means responsive to said a.c. source given amplitude, to said node means a.c. energy level, and to said rechargeable storage battery means given energy level for controlling said input a.c.-to-a.c. converter to derive a said control a.c. signal select amplitude of value below said a.c. source given amplitude to effect maintenance of said a.c. node means predetermined a.c. energy level and maintenance of said rechargeable battery means given energy storage capacity.

2. The apparatus of claim 1 in which said control means is responsive in the absence of said a.c. source input to provide an effective maintenance of said a.c. node means predetermined a.c. energy level from said rechargeable storage battery means.

3. The apparatus of claim 1 in which:
   said a.c. node connection comprises transformer means having an input winding, a center winding, and an output winding mutually associated in energy transfer relationship;
   said input a.c.-to-a.c. converter means comprises:
   an a.c.-to-d.c. input converter having an a.c. side connectable with said a.c. source input and a d.c. side, and
   a d.c.-to-a.c. input converter having a d.c. side coupled with said a.c.-to-d.c. input converter d.c. side and having an a.c. side deriving an a.c. signal of first predetermined frequency coupled with said input winding;
   said output a.c.-to-a.c. converter means comprises:
   an a.c.-to-d.c. output converter having an a.c. side coupled with said a.c. node connection and a d.c. side providing a d.c. output, and
   d.c.-to-a.c. output converter means having a d.c. side coupled with said a.c.-to-d.c. output converter means d.c. output and an a.c. side for providing an a.c. output connectable with said load.

4. The apparatus of claim 1 in which said a.c. node connection comprises transformer means having an input winding coupled with said input a.c.-to-a.c. converter second side, a center winding coupled with said d.c.-to-a.c. converter means a.c. side, and an output winding coupled with said output a.c.-to-a.c. converter input side.

5. Power supply control apparatus employable with an a.c. source input of given frequency and amplitude for providing a regulated output to a load, comprising:
   battery means of given storage level and capacity for providing a rechargeable storage reservoir;
   node means for establishing a d.c. node connection having a predetermined energy level;
   input converter means coupled with a select impedance between said node connection and said a.c. source and controllable to provide at said input a control a.c. signal in select phase relationship with said given phase and of select amplitude;
   bi-directional output converter means coupled between said node connection and said load for employing said energy at said node to derive said output to said load;
   bi-directional reservoir inverter means having a d.c. side coupled with said battery means, including inverter switching means actuable at a select frequency to provide a time varying output of given phase;
   bi-directional a.c.-to-d.c. converter means having an a.c. side responsive to said time varying output, a d.c. side coupled in energy transfer relationship with said node connection and including converter switching means controllable to derive a select phase relationship of said a.c. side with respect to said time varying output given phase; and
   control means for controlling said converter switching means to supply energy to said node connection to maintain said energy level by effecting a selectively lagging said phase relationship of said converter means a.c. side with respect to said time varying output given phase.

6. The power supply control apparatus of claim 5 in which said control means is responsive in the presence of said a.c. source input to maintain said battery means given storage level by effecting an altering of said selective lagging phase relationship.

7. The power supply control apparatus of claim 6 in which said control means is responsive to maintain said node means energy level in the presence of said a.c.

source input by selectively adjusting said select phase relationship and said select amplitude of said input converter means control a.c. signal.

8. The power supply control apparatus of claim 5 in which:
   said bi-directional a.c.-to-d.c. converter means includes:
   first capacitor means for selectively storing energy from said source;
   second capacitor means for selectively storing energy from said source;
   said inverter switching means includes first switching means for connection with said source in a given polar sense and actuable into a conductive state, and second switching means for connection with said source in a polar sense opposite said given polar sense and actuable into a conductive state;
   first inductive winding means coupled with said first switching means and first and second capacitor means;
   second inductive winding means coupled with said second switching means and said first and second capacitor means; and
   said control means includes means for actuating said first switching means to effect current conduction from said first capacitor means through said first inductive winding means and, simultaneously, to effect current conduction from said second capacitor means through said second inductive winding means, and for alternately actuating said second switching means to effect current conduction from said first capacitor means through said second inductive winding means and, simultaneously, to effect current conduction from said second capacitor means through said first inductive winding means.

9. Power supply control apparatus employable with an input a.c. source of given frequency and amplitude for providing a regulated output to a load, comprising:
   positive and negative rail means for establishing a d.c. node connection having a predetermined effective energy level;
   capacitor means coupled with said rail means for providing energy storage at said node connection;
   an input converter including first switching means coupled with said rail means and connectable with said input a.c. source and controllable for applying an a.c. signal of select amplitude to said source at said given frequency and in select phase relationship therewith;
   an output converter including second switching means coupled with said rail means, energizable therefrom, connectable with said load and controllable for applying an a.c. output thereto;
   battery means of given storge level and capacity for providing a rechargeable energy reservoir;
   voltage level adjustment means having primary and secondary sides for selectively boosting voltages asserted at said primary side;
   bi-directional reservoir inverter means having a d.c. side coupled with said battery means and an a.c. side coupled with said voltage level adjustment means primary side for applying an a.c. output of given phase and frequency thereto;
   bi-directional a.c.-to-d.c. rectifier means having controllable third switching means coupled with said voltage level adjustment means secondary side and said rail means for association in energy transfer relationship with said d.c. node connection; and
   control means responsive to said a.c. source given amplitude and frequency and to said rail means effective energy level when below said predetermined energy level to apply a select phase lag with respect to said bidirectional a.c.-to-d.c. rectifier means controllable third switch means and said bidirectional reservoir inverter means to derive an effective said predetermined energy level at said node connection.

10. Power supply control apparatus employable with an input a.c. source of given frequency and amplitude for providing a regulated output to a load, comprising:
    positive and negative rail means for establishing a d.c. node connection having an effective predetermined energy level;
    capacitor means coupled with said rail means for providing energy storage at said node connection;
    an input converter including first switching means coupled with said rail means and connectable with said input a.c. source and controllable for applying an a.c. signal of select amplitude to said source at said given frequency and in select phase relationship therewith;
    an output converter including second switching means coupled with said rail means, energizable therefrom, connectable with said load and controllable for applying an a.c. output thereto;
    battery means of given storage level and capacity for providing a rechargeable energy reservoir;
    voltage level adjustment means having primary and secondary sides for selectively boosting voltages asserted at said primary side;
    bi-directional reservoir inverter means having a d.c. side coupled with said battery means and an a.c. side coupled with said voltage level adjustment means primary side for applying an a.c. output of given phase and frequency thereto;
    bi-directional a.c.-to-d.c. rectifier means having controllable third switching means coupled with said voltage level adjustment means secondary side and said rail means for association in energy transfer relationship with said d.c. node connection; and
    control means responsive to said a.c. source given amplitude and frequency and to said rail means energy level for controlling said first switching means to derive a said a.c. signal of amplitude value below that of said input a.c source selected to effect the passage of energy to said node connection to effectively maintain said predetermined energy level, and to control said bidirectional rectifier third switching means as a synchronous rectifier in phase coincidence with said a.c. output given phase in the presence of adequate said passage of energy from said input a.c. source.

11. The power supply control apparatus of claim 10 in which said control means is responsive in the presence of a said node connection energy level below said predetermined energy level to apply a select phase lag control of said bidirectional a.c.-to-d.c. rectifier means controllable third switching means to effect return of said node connection to said predetermined energy level.

12. The power supply control apparatus of claim 10 in which said control means includes a first triangle waveform generator for deriving a first triangle waveform signal having an amplitude proportional to the voltage level at said node connection, oscillator means responsive to said input a.c. source for deriving a first control a.c. signal of frequency corresponding to said given frequency, first comparator means responsive to said first control a.c. signal and said first triangular waveform signal for deriving an output pulse width modulation signal, and first driver means responsive to said output pulse width modulation signal for controlling said output inverter second switching means.

13. The power supply control apparatus of claim 10 in which said control means includes a triangle waveform generator for deriving a triangle waveform signal having an amplitude proportional to the difference extant between the instantaneous energy level at said node connection and said predetermined energy level, means deriving a control a.c. signal proportional with said input a.c. source, comparator means responsive to said control a.c. signal and said triangular waveform signal for deriving an input pulse width modulation signal, and driver means responsive to said input pulse modulation signal for controlling said input inverter first switching means.

14. The power supply control apparatus of claim 10 in which said control means includes:
   a first triangle waveform generator for deriving a first triangle waveform signal having an amplitude proportional to the voltage level at said node connection, oscillator means responsive to said input a.c. source for deriving a first control a.c. signal of frequency corresponding to said given frequency, first comparator means responsive to said first control a.c. signal and said first triangular waveform signal for deriving an output pulse width modulation signal, and first driver means responsive to said output pulse width modulation signal for controlling said output inverter second switching means; and
   a second triangle waveform generator for deriving a second triangle waveform signal having an amplitude proportional to the difference extant between the instantaneous energy level at said node connection and said predetermined energy level, means deriving a second control a.c. signal proportional with said input a.c. source, second comparator means responsive to said second control a.c. signal and said second triangular waveform signal for deriving an input pulse width modulation signal, and second driver means responsive to said input pulse width modulation signal for controlling said input inverter first switching means.

15. The power supply control apparatus of claim 14 in which said control means is responsive in the presence of a said node connection energy level below said predetermined energy level to apply a select phase lag control of said bidirectional rectifier third switching means to effect return of said node connection to said predetermined energy level.

16. The power supply control apparatus of claim 10 in which:
   each said first and second switching means includes a solid-state switch having gate, source, and drain terminals and actuable in response to an applied switching logic signal of select modulation frequency; and
   said control means includes a driver circuit coupled in actuating relationship with each said solid-state switch comprising:

input circuit means responsive to said applied switching logic signal for deriving a first on logic condition;
memory capacitor means chargeable for deriving a second on logic condition;
charge switching means responsive to said first on logic condition for effecting a rapid charge of said memory capacitor means;
logic gate means responsive to the simultaneous presence of said first and second logic conditions for deriving an on switching condition;
drive switch means coupled with said gate and source terminals and responsive to said on switching condition for applying a gating voltage thereacross to effect said actuation of said solid-state switch;
threshold responsive network means having an input responsive to voltage levels at said drain terminal for providing a disable output when said levels exceed a predetermined value; and
shunt means coupled with said memory capacitor means for effecting the rapid discharge thereof in response to said disable output.

17. The power supply control apparatus of claim 16 including impedance means coupled in charging relationship with said memory capacitor means for effecting the charge thereof over an interval representing a modulation frequency less than said select modulation frequency.

18. The power supply control apparatus of claim 16 including delay network means coupled with said threshold responsive network means input for selectively delaying the assertion of said voltage levels of said drain terminal thereto.

19. Power supply control apparatus employable with an a.c. source input of given phase frequency and amplitude to provide a regulated output to a load, comprising:
   an input a.c.-to-d.c. converter having an a.c. side coupled with said a.c. source input and a d.c. side and controllabe to provide at said a.c. side a control a.c. signal in select phase relationship with said given phase and of select amplitude;
   rechargeable storage battery means having a given energy level and a capacity for providing energy in the form of direct current;
   node means in energy transfer communication with said d.c. side of said input a.c.-to-d.c. converter and with said rechargeable storage battery means for deriving a node connection exhibiting a predetermined energy level;
   an output d.c.-to-a.c. converter having a d.c. side coupled with said node connection and an a.c. side deriving a first output a.c. signal of predetermined frequency selected having a value greater than said given frequency;
   isolation transformer means having a primary winding coupled to receive said first output a.c. signal and having a secondary winding;
   a.c.-to-d.c. converter means having an a.c. side coupled with said isolation transformer means secondary winding and a d.c. side for providing a d.c. output;
   d.c.-to-a.c. converter means having a d.c. side coupled in energy receiving relationship with said d.c. output and an a.c. side deriving a second a.c. output connectable with said load; and
   control means responsive to said a.c. source given amplitude, to said node means energy level, and to said rechargeable storage battery means given energy level for controlling said input d.c.-to-a.c. converter to derive a said control a.c. signal select amplitude of value below said a.c. source given amplitude to effect maintenance of said node means predetermined energy level and maintenance of said rechargeable storage battery means given energy capacity.

* * * * *